US009642089B2

(12) United States Patent
Sharma et al.

(10) Patent No.: US 9,642,089 B2
(45) Date of Patent: May 2, 2017

(54) METHOD AND SYSTEM FOR PLANAR, MULTI-FUNCTION, MULTI-POWER SOURCED, LONG BATTERY LIFE RADIO COMMUNICATION APPLIANCE

(71) Applicant: SecureALL Corporation, Mountain View, CA (US)

(72) Inventors: Arun Kumar Sharma, Cupertino, CA (US); Michael Wurm, Redwood City, CA (US); Richard Schaffzin, Mountain View, CA (US); Prajakta Setty, Fremont, CA (US)

(73) Assignee: SecureALL Corporation, Mountain View, CA (US)

( * ) Notice: Subject to any disclaimer, the term of this patent is extended or adjusted under 35 U.S.C. 154(b) by 0 days.

(21) Appl. No.: 14/444,949

(22) Filed: Jul. 28, 2014

(65) Prior Publication Data
US 2016/0100368 A1    Apr. 7, 2016

Related U.S. Application Data

(63) Continuation-in-part of application No. 13/747,362, filed on Jan. 22, 2013, now Pat. No. 8,861,576, which
(Continued)

(51) Int. Cl.
*H04W 52/02* (2009.01)
*H04B 5/00* (2006.01)

(52) U.S. Cl.
CPC ...... *H04W 52/0261* (2013.01); *H04B 5/0062* (2013.01)

(58) Field of Classification Search
CPC ................. H04W 52/0261; H04B 5/0062
See application file for complete search history.

(56) References Cited

U.S. PATENT DOCUMENTS 3,097,301 A    7/1963   Sharpe et al.
4,036,178 A    7/1977   Lee et al.
(Continued)

FOREIGN PATENT DOCUMENTS

CA    2597684    7/2006
DE    19614362 C1    7/1997
(Continued)

OTHER PUBLICATIONS

Notification of Transmittal of International Search Report and Written Opinion by the International Searching Authority, International Search Report, Written Opinion, in PCT application PCT/US2013/032669; Jul. 10, 2013.
(Continued)

*Primary Examiner* — Leon Flores
(74) *Attorney, Agent, or Firm* — Haynes and Boone, LLP

(57) ABSTRACT

Some embodiments provide multifunctional device that provides two or more of the following functions: a) EKey; b) Ecall capability; c) Body Electric Field measurement; d) Body proximity measurement; e) External Electric Field measurement; f) One or two way voice announcement; g) Motion sensor. Some embodiments provide an Ekey that operates from battery energy and energy harvested by one or more of the following transducers: a) Photo voltaic cell; b) Radio Frequency antenna; c) Mechanical vibration, flexing; c) thermo-electric transducer. Some embodiments provide a planar Ekey encapsulated in an insulator matrix and comprising: a) antenna realized on a flat substrate; b) Electronic circuits realized on a flat substrate that provided interconnection to electronic components and is parallel to antenna plane; b) A conformal shaped ES device that conforms above the electronic components. Other features are also provided.

1 Claim, 12 Drawing Sheets

Badge hanger ES EHVD

Related U.S. Application Data is a continuation of application No. 12/500,587, filed on Jul. 9, 2009, now Pat. No. 8,472,507, application No. 14/444,949, which is a continuation-in-part of application No. 13/340,520, filed on Dec. 29, 2011, now Pat. No. 8,912,968, application No. 14/444,949, which is a continuation-in-part of application No. 13/691,626, filed on Nov. 30, 2012, application No. 14/444,949, which is a continuation-in-part of application No. 13/843,757, filed on Mar. 15, 2013, application No. 14/444,949, which is a continuation-in-part of application No. 13/841,079, filed on Mar. 15, 2013, now abandoned.

(60) Provisional application No. 61/858,821, filed on Jul. 26, 2013, provisional application No. 61/079,435, filed on Jul. 9, 2008, provisional application No. 61/428,155, filed on Dec. 29, 2010, provisional application No. 61/565,450, filed on Nov. 30, 2011, provisional application No. 61/611,577, filed on Mar. 16, 2012, provisional application No. 61/611,575, filed on Mar. 16, 2012.

(56) References Cited

U.S. PATENT DOCUMENTS

| | | | |
|---|---|---|---|
| 4,839,640 | A | 6/1989 | Ozer et al. |
| 4,898,010 | A | 2/1990 | Futami et al. |
| 4,936,316 | A | 6/1990 | Jewett |
| 5,023,597 | A | 6/1991 | Salisbury |
| 5,252,960 | A | 10/1993 | Duhame |
| 5,387,993 | A | 2/1995 | Heller et al. |
| 5,473,318 | A | 12/1995 | Martel |
| 5,485,577 | A | 1/1996 | Eyer et al. |
| 5,515,036 | A | 5/1996 | Waraksa et al. |
| 5,530,839 | A | 6/1996 | Komoto |
| 5,586,121 | A | 12/1996 | Moura et al. |
| 5,602,535 | A | 2/1997 | Boyles et al. |
| 5,649,099 | A | 7/1997 | Theimer et al. |
| 5,719,564 | A | 2/1998 | Sears |
| 5,774,064 | A | 6/1998 | Lambropoulos et al. |
| 5,815,811 | A | 9/1998 | Pinard et al. |
| 5,878,134 | A | 3/1999 | Handelman et al. |
| 5,922,049 | A | 7/1999 | Radia et al. |
| 5,933,074 | A | 8/1999 | Settles et al. |
| 5,940,510 | A | 8/1999 | Curry et al. |
| 5,973,611 | A | 10/1999 | Kulha et al. |
| 6,002,332 | A | 12/1999 | King |
| 6,007,338 | A | 12/1999 | DiNunzio et al. |
| 6,008,727 | A | 12/1999 | Want et al. |
| 6,041,411 | A | 3/2000 | Wyatt |
| 6,064,309 | A | 5/2000 | Sellers et al. |
| 6,097,301 | A | 8/2000 | Tuttle |
| 6,107,934 | A | 8/2000 | Andreou et al. |
| 6,111,977 | A | 8/2000 | Scott et al. |
| 6,219,439 | B1 | 4/2001 | Burger |
| 6,225,950 | B1 | 5/2001 | Johansson et al. |
| 6,236,335 | B1 | 5/2001 | Goodwin, III |
| 6,304,168 | B1 | 10/2001 | Ohta et al. |
| 6,304,226 | B1 | 10/2001 | Brown et al. |
| 6,308,181 | B1 | 10/2001 | Jarvis |
| 6,329,909 | B1 * | 12/2001 | Siedentop ............... B60R 25/04 307/10.2 |
| 6,518,882 | B2 | 2/2003 | Johnson et al. |
| 6,570,487 | B1 | 5/2003 | Steeves |
| 6,690,259 | B2 | 2/2004 | Aslanidis et al. |
| 6,713,895 | B1 | 3/2004 | Krapfl |
| 6,816,083 | B2 | 11/2004 | Brandt |
| 6,837,427 | B2 | 1/2005 | Overhultz et al. |
| 6,888,459 | B2 | 5/2005 | Stilp |
| 6,967,587 | B2 | 11/2005 | Snell et al. |
| 6,972,660 | B1 | 12/2005 | Montgomery, Jr. et al. |
| 7,012,503 | B2 | 3/2006 | Nielsen |
| 7,149,849 | B2 | 12/2006 | Wall et al. |
| 7,183,897 | B2 | 2/2007 | Tang et al. |
| 7,227,506 | B1 | 6/2007 | Lewis, Jr. |
| 7,301,437 | B2 | 11/2007 | Sasaki et al. |
| 7,366,812 | B2 | 4/2008 | Lambourn et al. |
| 7,446,644 | B2 | 11/2008 | Schaffzin et al. |
| 7,463,134 | B1 | 12/2008 | Stilley |
| 7,487,538 | B2 | 2/2009 | Mok |
| 7,499,283 | B2 | 3/2009 | De Los Santos et al. |
| 7,526,934 | B2 | 5/2009 | Conforti |
| 7,577,496 | B2 | 8/2009 | Walker et al. |
| 7,617,522 | B2 | 11/2009 | Schmidt et al. |
| 7,668,830 | B2 | 2/2010 | Hakala |
| 7,688,179 | B2 | 3/2010 | Kurpinski et al. |
| 7,755,482 | B2 | 7/2010 | Hubbard |
| 7,792,861 | B2 | 9/2010 | Kudoh et al. |
| 7,805,169 | B2 | 9/2010 | Hicks, III |
| 7,856,448 | B2 | 12/2010 | Sheehan |
| 7,894,810 | B2 | 2/2011 | Feher |
| 7,898,382 | B2 | 3/2011 | Berstis et al. |
| 7,933,835 | B2 | 4/2011 | Keane et al. |
| 7,933,925 | B2 | 4/2011 | Sreedhar |
| 7,953,823 | B2 | 5/2011 | Rider et al. |
| 8,005,777 | B1 | 8/2011 | Owen et al. |
| 8,031,725 | B2 | 10/2011 | Calin |
| 8,044,797 | B2 | 10/2011 | Brommer et al. |
| 8,102,239 | B2 | 1/2012 | Woo |
| 8,141,296 | B2 | 3/2012 | Bem |
| 8,149,087 | B2 | 4/2012 | Brillon |
| 8,228,165 | B2 | 7/2012 | Marchetto et al. |
| 8,244,762 | B2 | 8/2012 | Cimino |
| 8,245,291 | B2 | 8/2012 | Kumar et al. |
| 8,249,910 | B2 | 8/2012 | Wellman et al. |
| 8,251,287 | B2 | 8/2012 | Kochevar |
| 8,258,920 | B2 | 9/2012 | Crucs |
| 8,271,336 | B2 | 9/2012 | Mikurak |
| 8,279,077 | B1 | 10/2012 | Liff et al. |
| 8,310,340 | B2 | 11/2012 | Sikora et al. |
| 8,319,605 | B2 | 11/2012 | Hassan et al. |
| 8,340,975 | B1 | 12/2012 | Rosenberger |
| 8,473,192 | B2 | 6/2013 | Hannah et al. |
| 8,682,347 | B2 | 3/2014 | Hepo-Oja |
| 9,007,173 | B2 | 4/2015 | McIntyre et al. |
| 2002/0013909 | A1 | 1/2002 | Baumeister et al. |
| 2002/0034321 | A1 * | 3/2002 | Saito ................. G06K 9/00006 382/124 |
| 2002/0099945 | A1 | 7/2002 | McLintock et al. |
| 2003/0034877 | A1 | 2/2003 | Miller et al. |
| 2003/0046578 | A1 | 3/2003 | Brown et al. |
| 2003/0174095 | A1 | 9/2003 | Sievenpiper |
| 2004/0227656 | A1 | 11/2004 | Asakura et al. |
| 2004/0229560 | A1 | 11/2004 | Maloney |
| 2005/0040933 | A1 | 2/2005 | Huntzicker |
| 2006/0018139 | A1 | 1/2006 | Kolomeitsev et al. |
| 2006/0132284 | A1 | 6/2006 | Murphy et al. |
| 2006/0164208 | A1 | 7/2006 | Schaffzin et al. |
| 2007/0001816 | A1 | 1/2007 | Lindley et al. |
| 2007/0073694 | A1 | 3/2007 | Picault et al. |
| 2007/0176739 | A1 | 8/2007 | Raheman |
| 2007/0273478 | A1 | 11/2007 | Chevalier |
| 2007/0296545 | A1 | 12/2007 | Clare |
| 2008/0129446 | A1 | 6/2008 | Vader |
| 2008/0129448 | A1 | 6/2008 | Reichling |
| 2008/0191009 | A1 | 8/2008 | Gressel et al. |
| 2008/0290990 | A1 | 11/2008 | Schaffzin et al. |
| 2009/0007274 | A1 | 1/2009 | Martinez et al. |
| 2009/0267734 | A1 | 10/2009 | Kwon |
| 2010/0035539 | A1 | 2/2010 | Yoshida et al. |
| 2010/0052931 | A1 | 3/2010 | Kolpasky et al. |
| 2010/0164683 | A1 | 7/2010 | Sharma et al. |
| 2010/0167783 | A1 | 7/2010 | Alameh et al. |
| 2010/0283579 | A1 | 11/2010 | Kraus et al. |
| 2011/0001606 | A1 | 1/2011 | Charych |
| 2011/0221565 | A1 | 9/2011 | Ludlow et al. |
| 2012/0030733 | A1 | 2/2012 | Andrews et al. |
| 2012/0221189 | A1 | 8/2012 | Konet et al. |
| 2012/0274444 | A1 | 11/2012 | Micali et al. |
| 2012/0296685 | A1 | 11/2012 | Nishimura et al. |
| 2012/0305340 | A1 | 12/2012 | Wu |

(56) References Cited

U.S. PATENT DOCUMENTS

| | | |
|---|---|---|
| 2013/0006680 A1 | 1/2013 | O'Sullivan |
| 2013/0237193 A1 | 9/2013 | Dumas et al. |
| 2014/0281566 A1* | 9/2014 | Narendra ............ H04L 63/0853 713/185 |
| 2015/0102904 A1* | 4/2015 | Oh ..................... G07C 9/00309 340/5.61 |
| 2015/0135310 A1* | 5/2015 | Lee ........................ A61B 5/681 726/20 |
| 2015/0263663 A1* | 9/2015 | Lazo ....................... H02S 10/00 700/287 |

FOREIGN PATENT DOCUMENTS

| | | |
|---|---|---|
| EP | 0808971 | 11/1997 |
| EP | 1184236 A2 | 3/2002 |
| EP | 1841630 | 10/2007 |
| KR | 100361/2007 | 10/2007 |
| TW | 200626782 | 8/2006 |
| WO | 2006/078362 | 7/2006 |

OTHER PUBLICATIONS

European Search Report mailed Feb. 9, 2010, in European Application No. 05849475.8.

Fischetti, M. "Keyless Entry," Scientific American, 3 pages, (Jan. 2005).

Written Opinion of the International Searching Authority, International Application No. PCT/US05/044250, date of mailing Aug. 24, 2007, 5 pages.

International Preliminary Report on Patentability, International Application No. PCT/US051044250, date of issuance Sep. 18, 2007, 2 pages.

International Search Report, International Application No. PCT/US05/044250, date of mailing Nov. 14, 2007, 2 pages.

* cited by examiner perspective view
(Part of specification in US20120169543)

Cross section

Exploded view

Cross section

Exploded view

Top view

Cross section

Exploded view

Top view

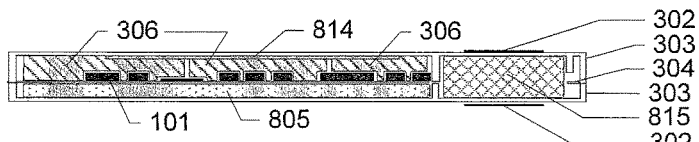
FIG. 5A
FIG. 5B
Multiple types of energy harvesting transducers
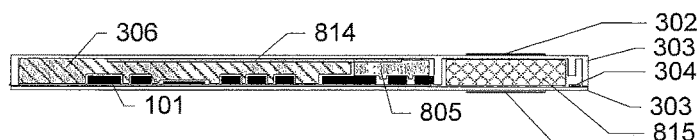
FIG. 6A
FIG. 6B
Multiple types of energy harvesting transducers
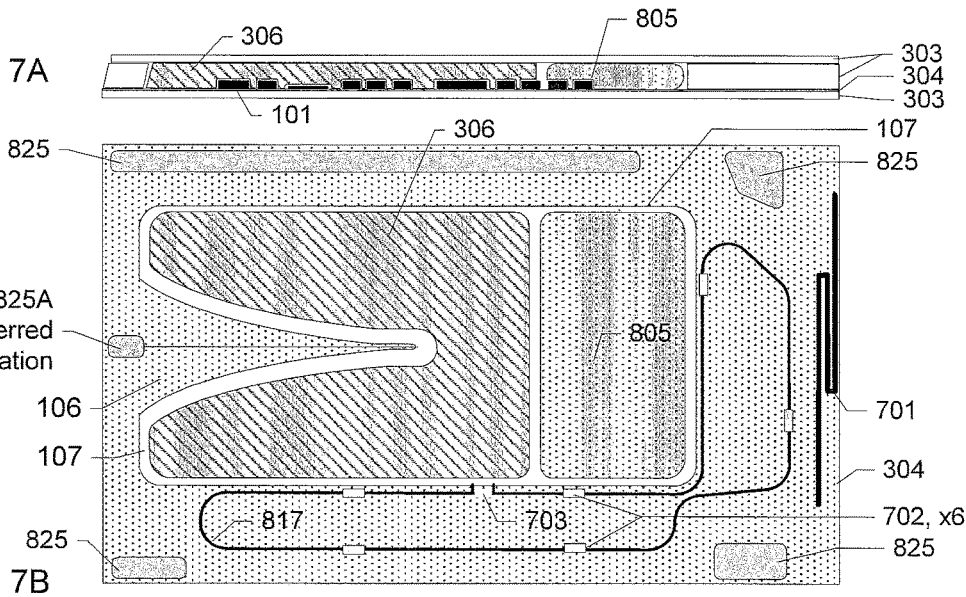
FIG. 7A
FIG. 7B
Badge format Ekey with Loop antenna and E-field electrodes Ekey block diagram Badge hanger ES EHVD

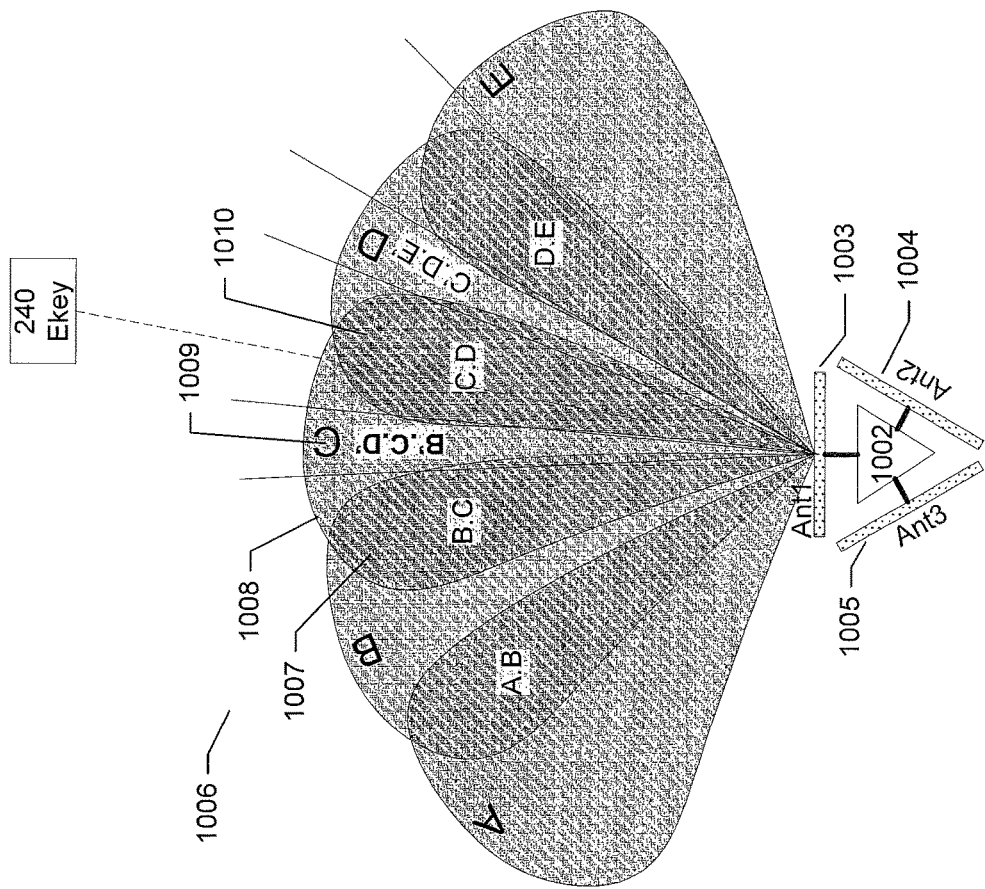
FIG. 10B
Triangle shaped steerable beam Antenna array
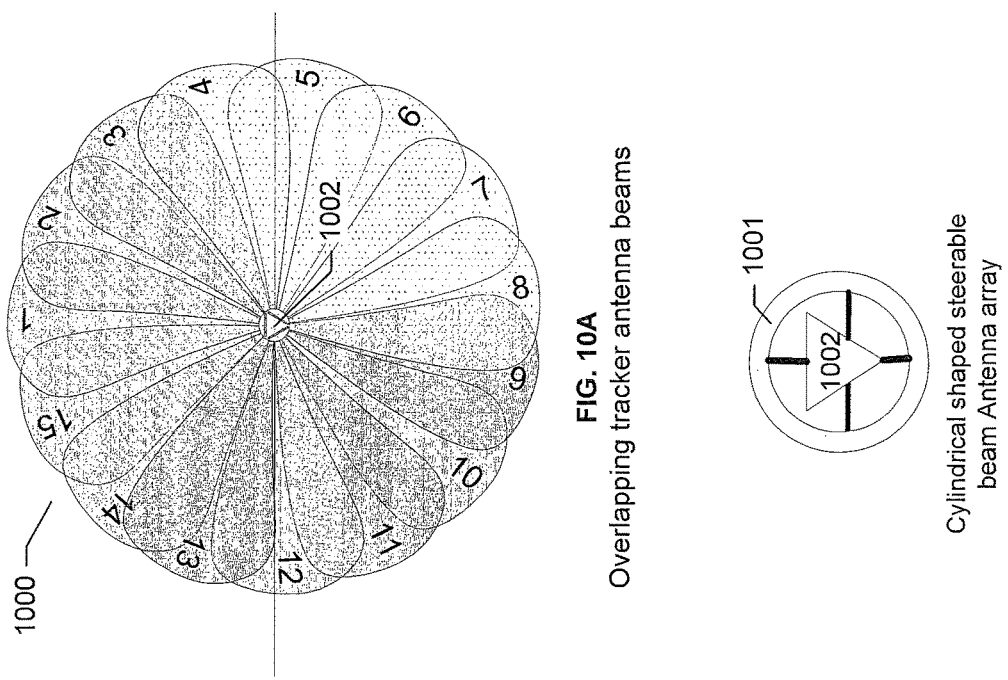
FIG. 10A
Overlapping tracker antenna beams
FIG. 10C
Cylindrical shaped steerable beam Antenna array

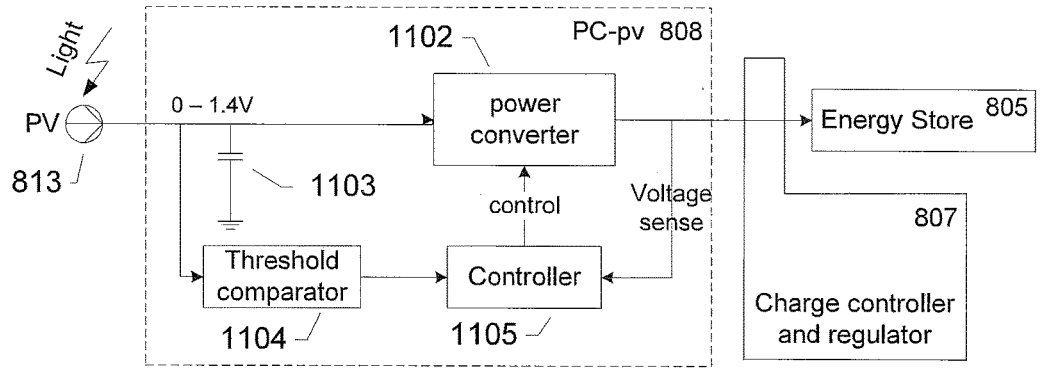
FIG. 11A : PV harvesting & power converter
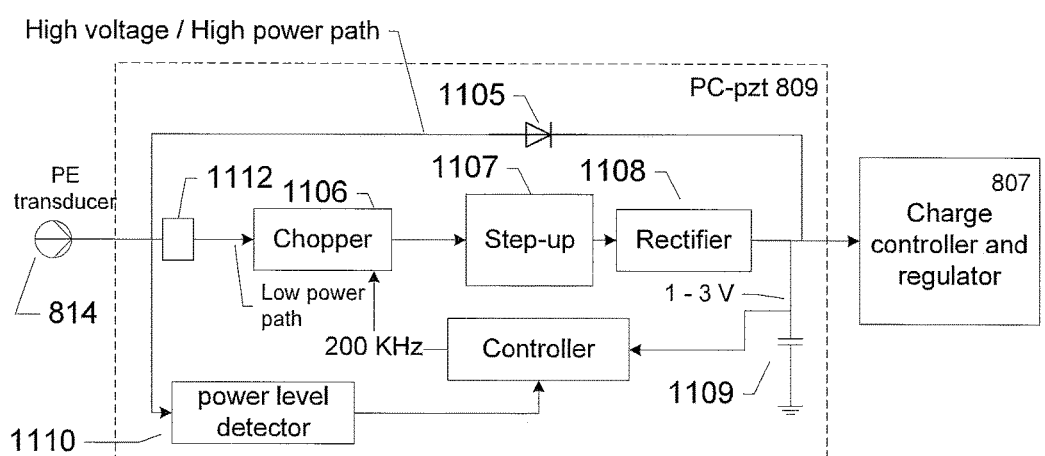
FIG. 11B : PE harvesting & power converter
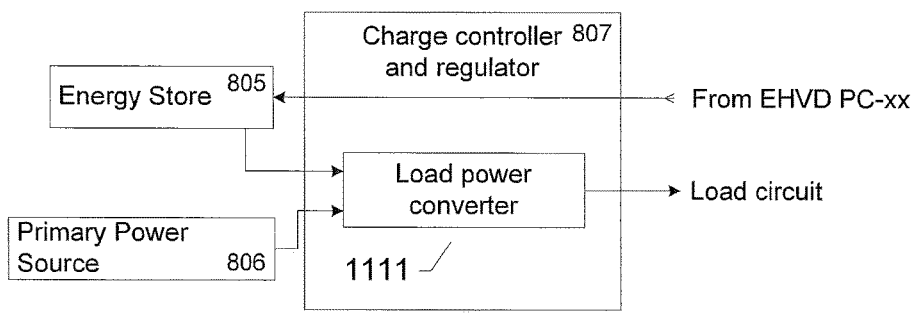
FIG. 11C : Load Power converter Detailed photo of multi-layer PCB layout.
As per US20120169543

Planar structure with multiple antennas operating on different frequencies (as described in US20120169543 specification)

METHOD AND SYSTEM FOR PLANAR, MULTI-FUNCTION, MULTI-POWER SOURCED, LONG BATTERY LIFE RADIO COMMUNICATION APPLIANCE

CROSS REFERENCE TO RELATED APPLICATIONS

The present application claims priority of U.S. provisional patent application No. 61/858,821, filed Jul. 26, 2013, incorporated herein by reference. The present application is also:

1. A continuation-in-part (CIP) of U.S. patent application Ser. No. 13/747,362 filed on Jan. 22, 2013, incorporated herein by reference, which is a continuation of U.S. patent application of U.S. patent application Ser. No. 12/500,587 filed Jul. 9, 2009 (now U.S. Pat. No. 8,472,507), which application is incorporated herein by reference, which claims priority of U.S. provisional patent application 61/079,435 filed Jul. 9, 2008, incorporated herein by reference.
2. A continuation-in-part of U.S. patent application Ser. No. 13/340,520, filed Dec. 29, 2011, incorporated herein by reference, which claims priority of U.S. provisional patent application No. 61/428,155 filed Dec. 29, 2010, incorporated herein by reference.
3. A continuation-in-part of U.S. patent application Ser. No. 13/691,626 filed Nov. 30, 2012, incorporated herein by reference, which claims priority of U.S. provisional patent application No. 61/565,450 filed Nov. 30, 2011, incorporated herein by reference.
4. A continuation-in-part of U.S. patent application Ser. No. 13/843,757 filed Mar. 15, 2013, incorporated herein by reference, which claims priority of U.S. provisional patent application No. 61/611,577 filed Mar. 16, 2012, incorporated herein by reference.
5. A continuation-in-part of U.S. patent application Ser. No. 13/841,079 filed Mar. 15, 2013, incorporated herein by reference, which claims priority of U.S. provisional patent application No. 61/611,575 filed Mar. 16, 2012, incorporated herein by reference.

GLOSSARY/NOTATION

1. ASIC: Application specific integrated circuit
2. EDL: Electronic Door Lock
3. EHVD: Energy HarVesting device (E.g. Photo voltaic cell, Piezo-electric transducer, voice coil, peltier pile)
4. Ecall: Emergency Call, Distress Call
5. Ekey/E-Key: Electronic Key (for door access control, authorized access to resources/computer/lab equipment)
6. ES: Energy storing device (E.g. Super capacitor, rechargeable battery)
7. EST: Electrostrictive transducer
8. FPC: Flexible printed circuits, a type of PCB.
9. NFC: Near Field communication
10. ODA/OD Antenna: An Isotropic antenna disclosed in US20120169543
11. PPS: Primary Power Source
12. PCB: Printed circuit board.
13. PV cell: Photo voltaic cell, solar cell
14. PZT: Piezo Electric Transducer
15. RFID: Radio frequency identification
16. RF: Radio Frequency
17. RSSI: Received Signal Strength Indicator
18. TOF: Time of Flight
19. Tracker: Tracker is type of Locator.
20. UKey/Ukey: A type of Ekey made by SecureALL that works in hand free manner.

BACKGROUND OF THE INVENTION

This invention relates to realization of a multi-function portable wireless device. Some embodiments have an extremely low profile. In some embodiments, the device is powered by multiple types of energy sources and energy storing methods. (An energy source can be solar power, vibration energy harvesting, Peltier thermo-electric array, dry cell, and/or some other source; rechargeable energy storage may include a rechargeable battery and/or super capacitor and/or some other type).

Some embodiments relate to long endurance electronic devices, wireless communications, RFID and tracking systems. Some embodiments are suitable for systems with devices one or more of which are mobile.

A Ukey device available from SecureALL Corporation of California has been in use for the last few years, and has many breakthrough technologies that enable a hand-free key to provide door access. Namely the extremely long battery life due to ELP (extreme-low-power) technology, omni-directional (isotropic) antenna, low energy intensive cryptography (see US Pre-Grant Patent Publication 2012/0170751, incorporated herein by reference) and communication protocol (see US Pre-Grant Patent Publication 2013/0247153, incorporated herein by reference), which enable Access control information communication, efficient information synchronization etc.

Using the ELP energy conservation (U.S. pre-grant patent publication no. US 2010/0040120, incorporated herein by reference), the omni-directional antenna (reliable RF link budget, US pre-grant patent publication no. US 20120169543, incorporated herein by reference), energy conserving communication can be achieved. The present document discloses additional multiple new functions in innovative design elements in a future UKey, active RFID tag, sensor nodes; the document can as well be applied to other appliances that requires operating under limited energy and power constraints.

This document discloses methods to further increase battery life of an exemplary embodiment shown below as Ekey 240 (using CR2450 cell) from current 4.5 years by few times, or eliminate the need for a battery altogether. It also discloses methods to change the form factor to make it very thin (of the order of the thickness of current RFID access cards).

Conventional passive RFID technology suffers from extremely short communication range (typically 5-30 cm) with a RFID reader, and its RFID readers requires very high operating power requiring main power operation or large batteries. It has low data rate and small data payload.

Prior art semi-active RFID tags technology requires a battery, and communicates over longer range (typically 1-30 m) compared to passive RFID tags. The onboard battery is used only to provide power for telemetry and backscatter enabling circuits on the tag, not to generate RF energy directly. These systems have a low data rate and small-medium data payload. The RFID reader can be as power hungry as passive RFID reader.

The prior art active RFID systems have comparatively longer operating range (10-80 m) but require larger batteries. They provide high data rates and support larger data payloads. Its RFID reader is much less power hungry compared to passive RFID reader. Exemplary known active-RFID products are available from AeroScout, WhereNet and PanGo.

Due to battery and antenna considerations the conventional active RFID devices have a rather tall profile that makes it hard if not impossible to carry them in a pocket or wallet. There is a user demand for low profile electronic devices that can easily be carried in a pocket or a wallet. The present disclosure teaches methods to realize low profile electronic devices/appliances (appliances that are smart, multi-functional and that require no battery replacement). In some embodiments the battery is sealed in the case, or the device may not even have a primary battery (non-rechargeable).

A related problem in access control, people tracking and asset tracking is to be able to locate relative position of the active electronic device in a cost effective way. Prior art technologies exist but they have following significant disadvantages:
1. Direction Triangulation: Requires the space to be covered by two or more readers with direction finding capability.
2. Distance triangulation: Requires readers that can measure distance with the tag (time of flight measurement) and the desired space to be covered by two or more readers.

An embodiment of this disclosure teaches combined use of Time of flight (to get distance estimate) and steerable beam (get directional estimate) to position the location of the tag. This method is much more cost effective as a standalone reader can provide positioning without requiring complex cabling or communication between multiple readers.

An embodiment of this disclosure teaches combined use of Time of flight and steerable beam to position the location of the tag. This method is much more cost effective as a standalone reader can provide positioning without requiring complex cabling or communication between multiple readers.

Some embodiments provide a low profile multi-function Ekey 240 that is planar and low-profile like conventional passive RFID cards: the size of about a credit card and about 1 to 4 mm thickness. A preferred embodiment is about 60×30×2.5 mm.

SecureALL's customers love Ekey (Model-UKN) the current product functionality and form factor; however, some users want it in a format like an employee badge that can be imprinted with a photo and other information. Such form factor finds easy user acceptance because most already wear their employee badge (a pouch contains the employee badge, along with RFID proximity card in a transparent plastic pouch that has a clip attached to attach to person's dress). After work they put the card in the wallet or along the wallet in their pockets. This disclosure teaches methods to use energy harvesting methods that significantly increase battery life exploiting the way the users typically use the Ekey at work and off-work.

SUMMARY

Some embodiments are described below.

BRIEF DESCRIPTION OF THE DRAWINGS

FIGS. 3A, 3B, 3C, 3D, 3E, 4A, 4B, 4C, 5A, 5B, 6A, 6B, 7A and 7B show various embodiments of the disclosure that tremendously reduces the form factor of the Ekey.

FIG. 10A, 10B, 10C show tracker layout and its antenna beams.

FIG. 11A, 11B, 11C shows energy harvesting and charge controller bock diagram for various energy sources.

DESCRIPTION OF SOME EMBODIMENTS

SecureALL's Ekey consumes very low power and energy such that with a CR2450 battery it can typically last many years of operation before requiring battery change. The market requirement is to use smaller batteries so that the thickness of the Ekey can be reduced to be similar to a proximity RFID card. And add more functionality to the Ekey. Thus this disclosure teaches methods to make an even smaller form factor Ekey 240 with more functionality and almost indefinite battery life.

The embodiments described in this section illustrate but do not limit the invention. The invention is defined by the appended claims.

Numbering system: OPXX,
1) OP: Figure number where it was first specified and defined. "O" is optional when Figure number is single digit.
2) XX: Last two numerals FIG. 13A, 13B, 13C, 13D shows various components of prior art SecureALL Corporation's "UKN" model (UKey$_{TM}$) which is a type of E-Key. E-Key from other vendors has some aspects that are similar to SecureALL's "UKN" model.

The figures in FIG. 13A, 13B, 13C, 13D show the typical dimensions of the E-Key. The thickness is typically defined by packaging constrains of the electronics. At 13 mm thickness it is rather uncomfortable to put that in a wallet.

Figure 13A:
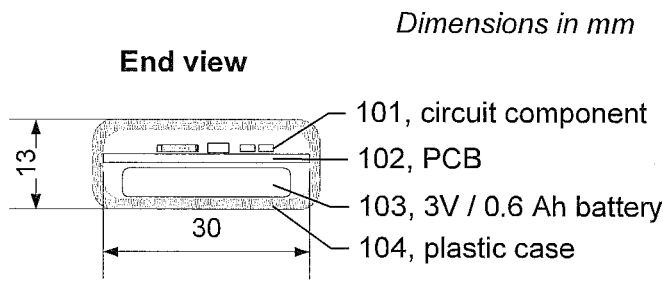
FIG. 13A, 13B illustrates a typical prior art Ekey packaging.
Figure 13B:
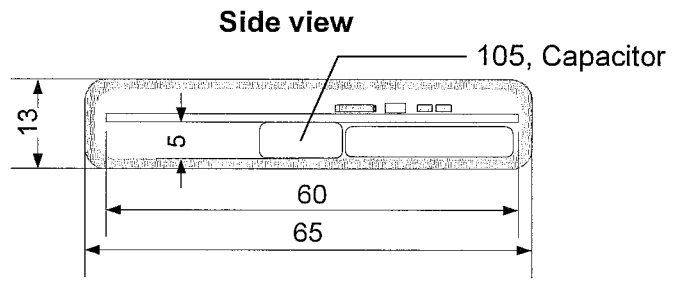

FIGS. 13A and 13B shows the end view and side view.

The circuit is realized by soldering the circuit components 101 on a Printed Circuit Board (PCB) 102. Most components are reflow soldered using contemporary surface mount technology (SMT). Other circuit components (E.g. large value energy storage (ES) capacitor 105) could be manually soldered or press-fitted. The PCB could employ a rigid dielectric substrate (E.g. FR4) or a flexible substrate (E.g. Flexible Printed Circuit (FPC)). A battery 103 is typically connected and secured to the PCB via a battery holder/clip. For example SecureALL's UKN employs coin-cell CR2450 battery (3 Volt/640 mAH rating and measuring 24.5×5 mm)). The plastic enclosure (104) provides physical protection to the electronics.

Figure 13C:
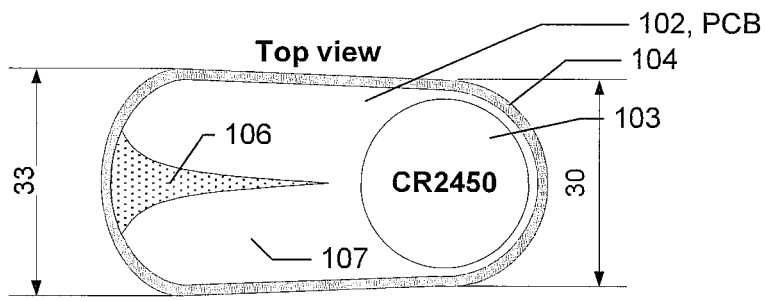
FIG. 13C, 13D illustrates a typical prior art Ekey exemplified with those Ekeys that use Omni directional antenna
Figure 13D:
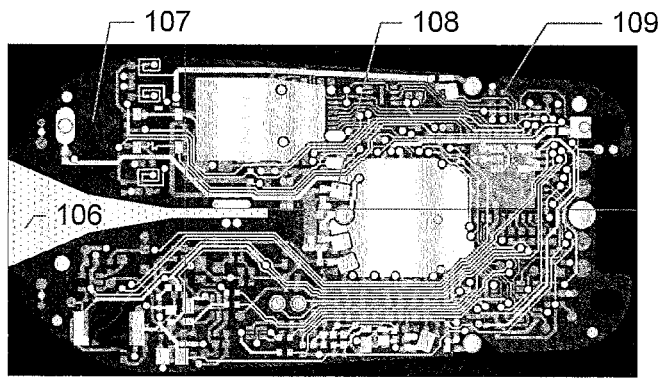

FIG. 13C shows the top view. It also shows SecureALL's "UKN" with integrated PCB and antenna (as taught in SecureALL's US patent application US 20120169543, True omni-directional antenna). The conducting ground plane 107 of the PCB 102 is shaped to have a flared aperture 106 that only has PCB substrate dielectric, forming a wideband, pseudo-isotropic antenna. FIG. 13D shows an image of the PCB Gerber file where the ground plane 107 is also used for circuit interconnection to connect various components on both sides of the PCB. Top layer 110 and bottom layer 109 provides conventional PCB traces and pads to allows soldering of components and interconnect them. Double-sided SMT assembly is a well known prior art.

Figure 1:
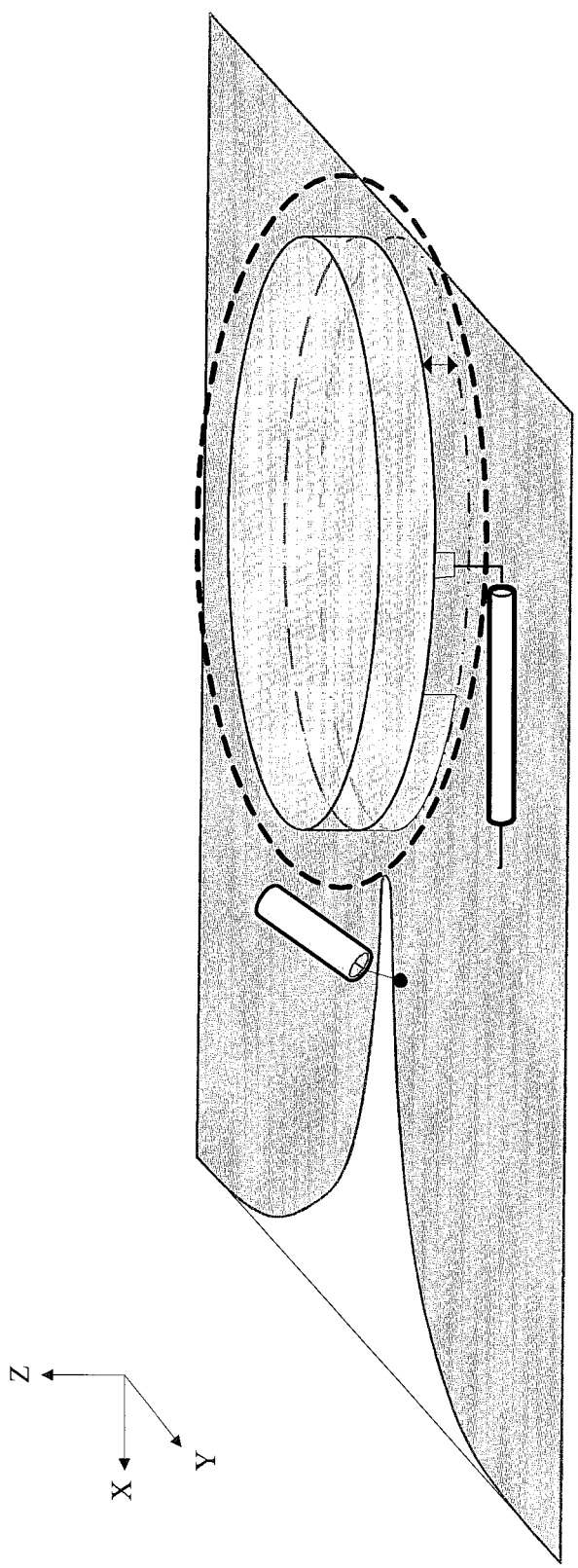
FIG. 1 illustrates a typical prior art Ekey exemplified with those Ekeys that use Omni directional antenna

FIG. 1 is a perspective view of the SecureALL's "UKN", (as taught in SecureALL's US patent application US 20120169543) where one can appreciate the thickness of the E-Key is due to battery and/or antenna packaging constraints.

Figure 14A:
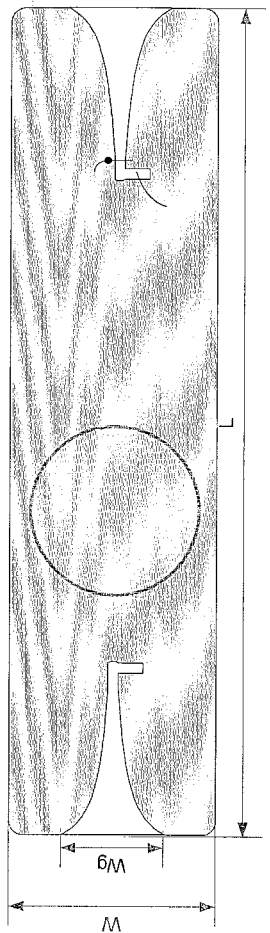
FIG. 14A, 14B, 14C shows prior art antenna methods to implement multiple antennas in a device that operate at different frequencies.
Figure 14C:
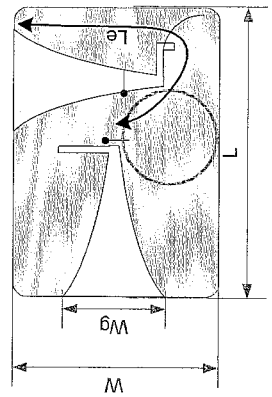
Figure 14B:
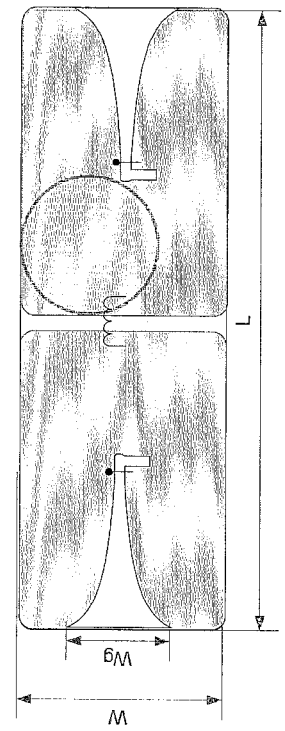

FIGS. 14A, 14B, 14C show an embodiment with a planar structure with multiple antennas operating on different frequencies (annotation numerals described in US pre-grant patent publication no. 2012/0169543, incorporated herein by reference), that some embodiments of the present disclosure can use to realize an E-key with transceiver(s) and RF energy harvesting circuit(s) operating on different frequencies/bands. One can also adapt this teaching to semi-planar structures.

Figure 8:
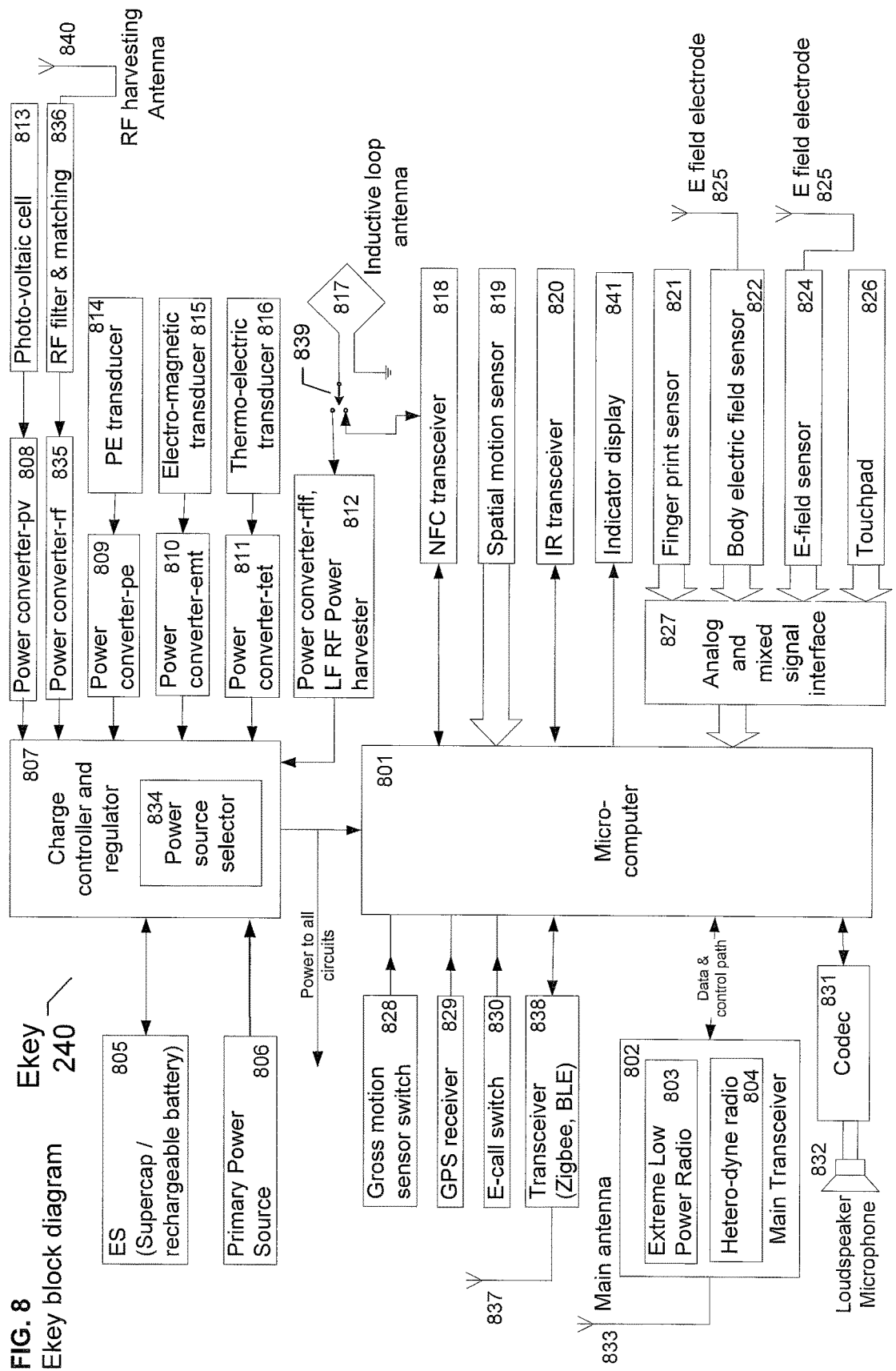
FIG. 8 shows the electronic block diagram of the Ekey.

FIG. 8 depicts an embodiment 240 of the present disclosure.

Micro-computer 801 is an energy efficient variant known to those skilled in the art that has a CPU, memory (volatile and/or non-volatile), various types of Input/output peripherals and runs a program to perform computations, responds to events and coordinates various electronic circuits.

Main transceiver 802 provides primary RF communication with other devices (Non limiting examples are router 250, door-lock 210, locator 260, and tracker 260). Use of license free ISM frequency band is desirable because of popularity, cost, interoperability and parts availability. Amongst others classical transceivers based on use of local oscillator and heterodyning principle and/or digital radios could be used using various kinds of modulation and protocol. UWB (Ultra-wide-band) radios could also be used. Specialized multi-tiered radios systems like those disclosed in US 20100040120 Low power radio communication system could also be used that have a Tier-1 Extreme Low Power Radio 803 (that does not use RF local Oscillator) and Tier-2 radio 804 that may use classical heterodyne based radio. The Main Transceiver 802 is connected to Main Antenna 833.

A prior art SecureALL UKey (UKN Model) includes the following elements of the FIG. 8 block diagram:
 a) Micro computer 801
 b) Main transceiver 802, comprising
  a. Main antenna 833
  b. Tier-1 Extreme Low Power Radio 803, and Tier-2 Heterodyne radio 804.
  c. A secondary antenna (not shown in this block diagram)
 c) Primary power source 806
 d) Energy Store 805
 e) A rudimentary power regulator connecting the PPS and ES to electronic load (Not shown in this block diagram)

Some embodiments of the present invention also include such elements but they are not necessarily identical to such elements in the UKN model. Ekey 240 may include such elements (which may or may not be identical to those of the UKN model) and may further include more transceivers to allow communication with various other systems. Transceiver 838 provides ability to communicate with other devices using a different set of frequency, modulation or protocol. It could for non limiting example be a IEEE802.15.4, Zigbee, Bluetooth Classic, Bluetooth Low Energy or Bluetooth High Speed. This could enable secondary authentication of Ekey's owner with owner's Smartphone or other items that may have a compatible transceiver and protocol. Transceiver 838 may share antenna 833 with the main transceiver 802 or have a separate antenna 837. A NFC (Near Field Communication) or RFID transceiver 818 may also be present to allow communication transactions with compatible devices in proximity. Typically they operate at 13.56 MHz frequency and 125 KHz respectively, and use inductive loop antenna 817 using magnetic field coupling. The inductive loop antenna 817 could also be used for non-galvanic charging when the device is place in close proximity to a charging station that generates appreciable short range magnetic coupling to transfer few watts of charging power. The system switches (using switch 839) the inductive loop antenna 817 between NFC transceiver 818 and Inductive power harvester 812 depending on use case, sensor input and periodic checking signal on inductive loop antenna 817.

Similar to transceiver 838 the Ekey may further comprise more transceivers to allow communication with various other systems. Transceiver 820 provides ability to communicate with other devices using optical radiation. Amongst other this could allow Ekey user to send IR (Infra Red) beam based commands to home entertainment system.

Energy Harvesting

ES 805 stores energy from various energy harvesting sources. ES 805 could be realized by many means including but not limited use of electronic components such as capacitor, supercapacitor, and rechargeable lithium-ion cell. In some embodiment ES can be implemented by employing both Supercapacitor and rechargeable cell. In some embodiments it is configured to work with Primary power source (PPS) 806 to increase ability to handle for short term higher power demand (compared to peak power capability of individual ES 805 or PPS 806).

PPS 806 provides electric power when electric power from harvested energy source(s) and/or ES is inadequate to meet instantaneous electrical power demand. In an embodiment it is a non-rechargeable battery.

Some embodiment of the present disclosure harvest energy from the environment to partially or fully provide operating power to the Ekey. Energy could be harvested from one or more sources from a group comprising:
 a) Photo voltaic cell
 b) Radio Frequency antenna
 c) Inductive field antenna
 c) Mechanical vibration or stress
 c) thermo-electric transducer Energy available from various energy harvesting devices (EHVD) is accepted by Charge controller and regulator (QCR) 807 that uses it to charge an energy storing device (ES) 805 and/or supply full or part of the operating power load of the Ekey/appliance. In a preferred embodiment ES is implemented using a Supercapacitor. QCR 807 circuits can be implemented by a variety of electronic methods known to those skilled in the art.

Power source selector 834 provides the function of selecting one or more available energy source to meet temporal power load.

Figure 12:
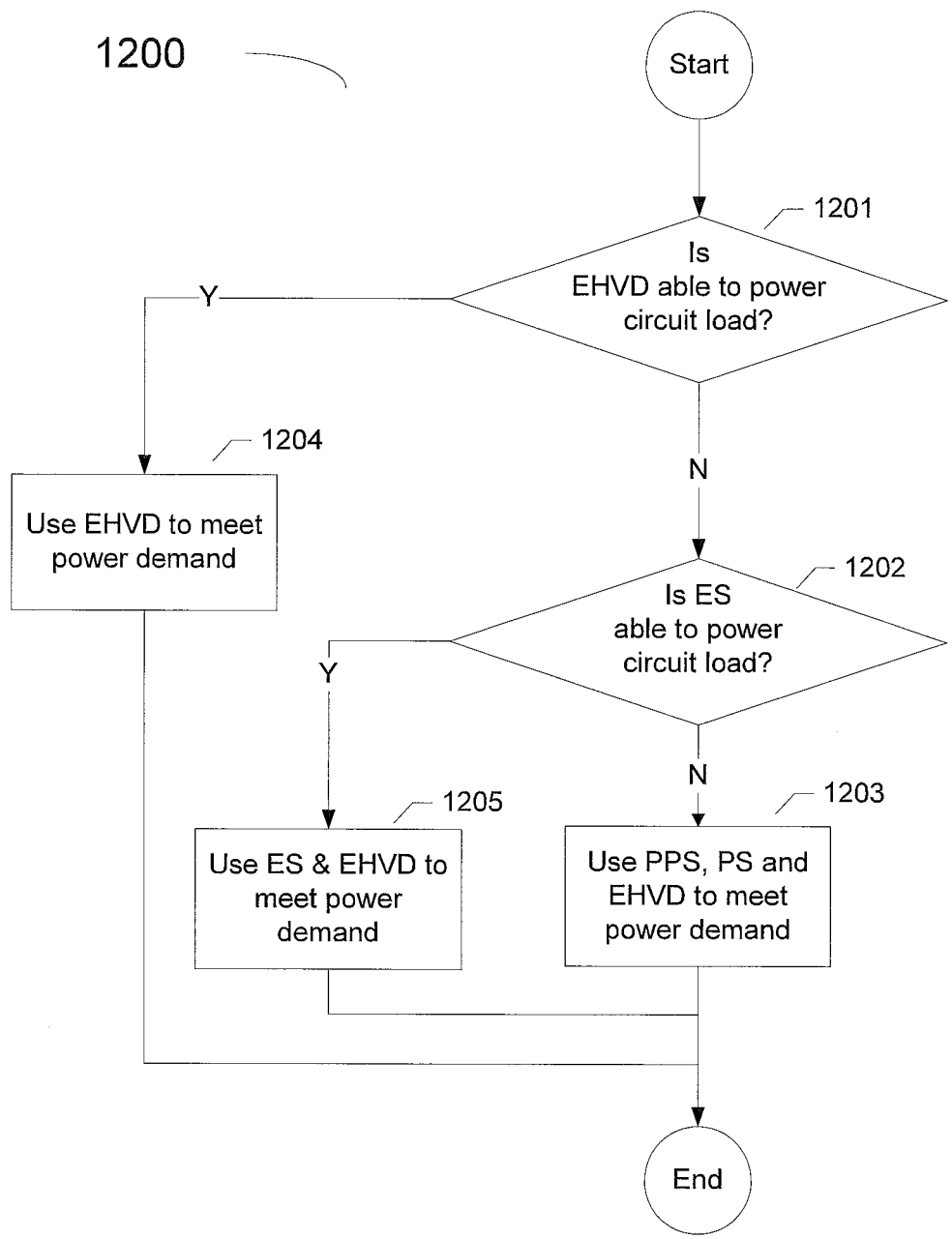
FIG. 12 shows an exemplary flow chart logic for energy source selection

FIG. 12 shows an exemplary flow chart logic 1200 that is evaluated by PPS 834 periodically and/or when operating state of Ekey or EHVD changes. The flowchart element 1201 first evaluates if the available power from all EVHD sources is enough to meet the temporal power load demand of the operative circuit (all circuit of the Ekey/appliance except the power circuit responsible for power generation, conditioning, regulation and distribution), in which case 1204 it conveys and convert EHVD power to a voltage level suitable to power the operative circuit. Else it determines 1202 if the available power from all EVHD sources and ES 805 is enough to meet the temporal power load demand of the operative circuit in which case 1205 it combines power from EHVDs and ES 805 and convert it a voltage level suitable to power the operative circuit. Else 1203 it combines power available from PPS 806, EHVDs and ES 805 and convert it a voltage level suitable to power the operative circuit. In an embodiment operation 1205 uses power from only ES 805. In another embodiment operation 1203 combines power available from PPS 806 and ES 805. And in yet another embodiment 1203 uses power from only PPS 806.

Photovoltaic (PV) array 813 generates electric power when light falls on it. The power converter (PC-pv) 808 efficiently converts the energy to a voltage level (3V typical) that the Charge controller and regulator (QCR) 807 can employ to power the Ekey. An exemplary block diagram in FIG. 11A shows an embodiment where sufficient power generated by PV array EHVD is detected by a threshold comparator 1104 that turns on converter controller 1105 and signals it to convert the input power to a voltage level suitable for QCR 807. In this example QCR 807 provides path to connect the PC-pv 808 output to the ES 805. Capacitor 1103 is typical input capacitance required for proper operation of power converter 1102.

FIG. 11C shows a method where QCR 807 allows power controllers from various EHVD to directly transfer energy to ES 805. One or more load power convert 1111 is employed to convert energy from ES 805 and/or PPS 806 to a suitable voltage level to meet load needs of Ekey's operative circuit.

In an embodiment ES 805 is realized by a rechargeable cell whose operating voltage range is close to the PPS's 806 nominal output voltage, enabling use of a simpler and more power efficient load power converter 1111.

In a preferred embodiment Supercapacitor is used to realize ES 805 and the power output from PC-pv (or PV-rf, PC-pzt, PC-emt, PC-tet etc.) is used to transfer charge to raise ES 805's voltage. (I.e. No effort is made to regulate the voltage across ES 805, instead it is allowed vary from zero to its maximum rated operating voltage) and QCR 807's load power converter 1111 is used to convert a widely varying input voltage from ES 805 to a regulated output voltage. This arrangement allows optimal use of supercapacitor's energy storage capacity. Contrast this with prior art conventional designs that use supercapacitor for energy storage but limit its operating voltage to operative circuit's minimum and maximum operating voltage that is typically ±20% of the integrated circuits nominal supply voltage (this is when supercapacitor is tied to Vdd power plane that powers all ICs). As an example if the CPU and transceiver IC operates at 1.8V nominal and Supercapacitor is rated for 3.0V. Total energy stored in a capacity is given by the equation $E=0.5*Capacity*V^2$/(where E—stored energy, V—capacitor's terminal voltage, C—capacitors capacity). Thus the conventional design only uses energy capacity difference between Vmin (in this case 1.44 v) and Vmax (in this case 2.16 v); Thus conventional capacity $Ec=0.5*Capacity*2.59$ (as $2.16^2-1.44^2=2.59$), where as the proposed embodiment using voltage range of 0.3V to 3.0 yields a capacity of $Ei=0.5*Capacity*8.9$ (because $3.0^2-0.3^2=8.9$), that is 343% of the conventional capacity.

In another embodiment the PC-pv 808 is designed to automatically find the maximum available power at given moment (as the power from PV is a functional of temporal illumination flux density on its surface, and some other parameters like temperature) and adapt its operating mode to most efficiently convert/transform it to charge the ES 805. In an embodiment using switching converter the operating mode parameters are well known to those skilled in the art (E.g. Load line, cycle charge, cycle energy, Buck/boost-period, -duty cycle, peak current, etc)

The present disclosure further teaches energy harvesting from ambient radio-frequency (RF) field that could be used by Ekey 240 that has extremely low average operating power For example SecureALL's Extreme Low Power based Radio transceiver (2.45 GHz ISM band) that is always operating while consuming only ~10 microWatt power, or radios using heterodyne based transceivers operating at extremely low average duty cycle.

Ekey 240 can be designed with wideband antenna, or multiple antennas that open doors to operating off energetic RF power density in ambient environment for large fraction of operating time, thus reducing battery size and/or considerably increasing battery life.

For example the small (33×65×13 mm size) SecureALL's Ukey already employs a wideband isotropic antenna (500 MHz bandwidth at center frequency of 2.44 GHz) that operates well with linear and circularly polarization RF power source. The antenna of a 2.4 GHz based Ekey/Ukey worn by a user who is using a hand held device (like laptop, tablet-PC, smart-phone etc.) will experience a strong 2.4 GHz band RF field. Such handheld devices periodically transmit +15 to +30 dBm power. Since the distance is at less than 1 m the FSPL (Free Space Propagation Loss) is only about −34 dB, thus the Ekey's isotropic antenna will receive −6 to −21 dBm energy (I.e. ~250 μW to 10 μW energy, which considerably much more than prior art) which can be harvested and used to supplement device operating at ~10 μWatt. It is important to note that the Ekey's physical size 33×65×13 mm make for a very small antenna aperture, yet using this scheme at 2.4 GHz it could harvest so much RF energy from other hand held wireless devices that it can provide substantial portion of the average power need of the Ekey. Similarly a 2.4 GHz WiFi router being used to stream video content transmitting at +30 dBm at 10 ft (FSPL=−50 dB) distance will provide ~−20 dBm (10 uW) power. The 5 GHz ISM band in USA permits use of even higher radiation level, thus allowing some embodiments of this invention to harvest even more power from devices using WiFi or other appliances commonly found at home, offices and civic places.

The 200 MHz frequency band below and 200 MHz band above the 2.4 GHz ISM band is heavily used licensed band, used by commercial users including mobile phone service providers. A wideband antenna can thus additionally capture and harvest energy from nearby phone towers and people using cell phones. Cell phones could transmit as much as +36 dBm power (4 Watt) that is many times more than WiFi routers, thus a rich source of ambient RF power intensity. The 5 GHz ISM band is even wider than the 2.4 GHZ ISM band thus will permit even richer RF channels, devices and transmitter population. Wideband energy harvesting as taught in this disclosure becomes even more compelling because realization of Ekey 240 antenna with wider bandwidth becomes easier (as on skilled in art of RF antenna knows that when thickness and size of the antenna radiating element becomes comparable to wavelength the bandwidth as a fraction of center frequency increases and "Antenna Q" decreases).

Ekey 240 using wideband antennas, and or multiple antennas can leverage RF energy harvesting. Such antennas are taught in SecureALL patent US20120169543 and used in SecureALLs Ukey/Ekey. See FIG. 1, 13A, 13B, 13C, 13D, 14A, 14B, 14C.

In an embodiment Ekey 240 has separate antenna 833 dedicated for main transceiver, and a separate RF harvesting antenna 840 (generally operating on a different frequency) connected to a suitable RF filter and matching circuit 836 to transform the RF impedance suitable for RF energy rectification into DC power by power converter-rf 835.

Figure 9A:
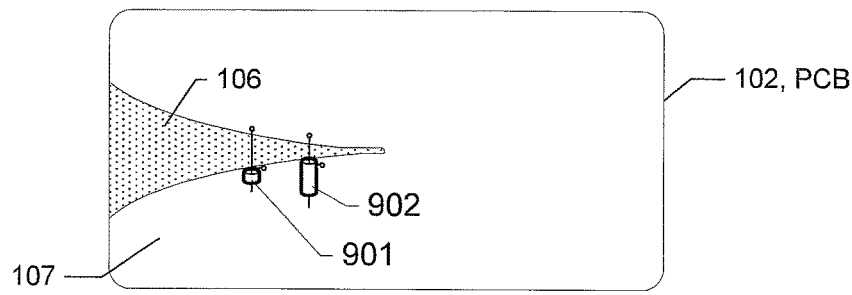
FIG. 9A shows an example of multiple feed points on an antenna.
Figure 9B:
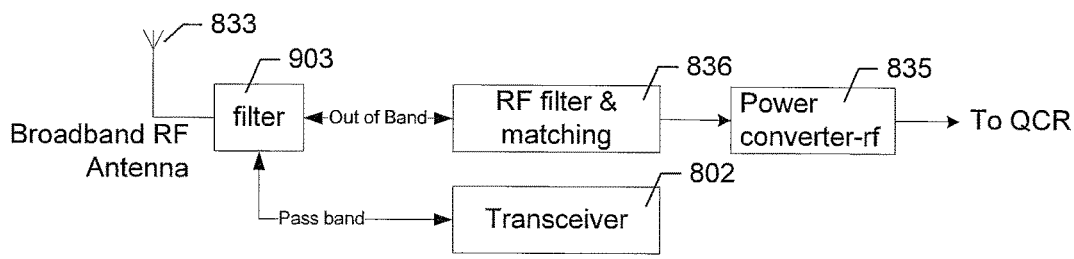
FIG. 9B, 9C, 9D shows methods to connect various elements of electronic function block for RF energy harvesting.

FIG. 9B shows an embodiment to harvest energy using a broadband antenna that is also used by the main transceiver 802. The main transceiver has access to the main antenna 833 via a filter 903 that implements a band pass filter function to allow exclusive access to the frequency band of interest to the main transceiver 802. The RF filter and matching 836 for energy harvesting circuit also has access to the main antenna 833 via the filter 903 that implements a band pass filter function on a separate port that allows exclusive access to frequency band of interest to the RF energy harvesting circuit.

Figure 9C:
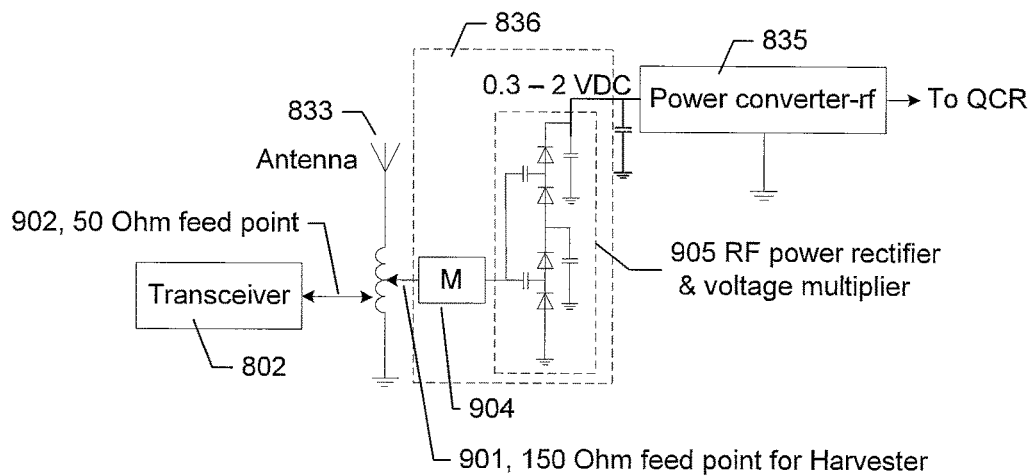
Figure 9D:
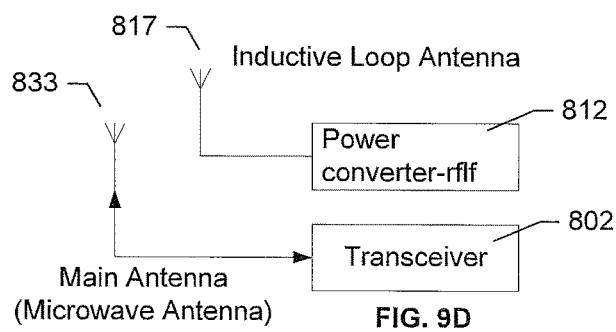

FIG. 9C shows another embodiment to harvest energy using a common antenna. Both main transceiver 802 and RF filter and matching 836 for energy harvesting are connected to the antenna. In a preferable embodiment the main transceiver 802 is connected to a feed point 902 whose feed point impedance matches transceiver's electronics (typically 50 ohm), and RF filter and matching 836 for energy harvesting is connected to a feed point 901 whose feed point impedance matches its electronics (typically an impedance much higher than 50 ohm to make available higher RF voltage that can later be easily rectified by a RF diode). RF filter and matching 836 comprise a RF matching and isolation circuit 904 that feeds the RF energy to a RF rectifier and voltage multiplier 905, which in turn generate a DC output voltage; when signal is too weak the diodes (in RF rectifier and voltage multiplier 905) are in high impedance state and the circuit 836 does not load the antenna feed point 901. Power converter-rf 835 is similar to PC-pv 808, comprising suitable power converter 1102 and controller 1105. Most of the time main transceiver 802 is in receive mode where the expected signal is −50 to −100 dBm, a level too weak for energy harvesting circuit to operate. When the antenna 833 receives a strong signal that is useful for energy harvesting (say −5 to −15 dBm) the RF filter and matching 836 for energy harvesting will start operating and absorb incident power (In some embodiment the main transceiver 802 could optionally be designed with an attenuator switch that RF filter and matching 836 can activate to reduce antenna loading by main transceiver 802, thus allowing maximum energy harvesting). The transceiver continues to get access to the incident signal, albeit somewhat attenuated due to energy absorption by 836 (which in most cases is beneficial helping the Automatic Gain Control AGC function). When the main transceiver 802 needs to transmit, the RF matching and isolation circuit 904 is switched to isolation state to ensure transmitted power is fully available for antenna radiation. This simpler method could also be used in application where main antenna 833 is a broadband antenna, allowing energy harvesting across the whole antenna bandwidth and the main transceiver 802 to operate normally in intended narrower band. In some embodiment the main transceiver 802 may have a filter to prevent unwanted signals from saturating the RF front end electronic.

FIG. 9A shows an embodiment Ekey 240 with feed point 902 to connect to main transceiver 802, and a higher impendence feed point 901 to connect to RF energy harvester circuit.

Ekey 240 can also harvest RF energy from environment by using the RF energy impinging on inductive loop antenna 817 via Power Converter-rflf 812 that has necessary frequency tuning, scanning, impedance matching and RF power rectification circuit. It harvests ambient RF energy for examples as a users walks by NFC security readers in super-stores entrance, RFID readers, or a local radio/TV broadcast transmitter.

An embodiment of RF harvesting system periodically sweeps the RF energy harvesting band to seek out the most energetic operating frequency and optimize the circuit for optimal performance. This is particularly useful for energy harvesting circuit elements in 836, 812 that have narrower bandwidth than the antenna it is connected to. It is also useful for situation when the antenna is small compared to operating wavelength, and for better performance it needs to be tuned to a specific frequency, and the tuning range spans a wider band. E.g. Ekey wanting to harvest energy from LF, MF, VHF, and UHF band sources. As scanning operation itself consumes energy, a further embodiment of the disclosure has the RF harvesting system periodically scans the RF energy harvesting band to seek out best operating frequency suitable for energy harvesting failing which it uses a back-off algorithm to reduce scanning period and conserve energy. This back off algorithm further could modify the behavior taking into consideration instantaneous energy available from other EHVD sources. Thus if PV array 813 is currently generating 1-mW energy it doesn't help much to bother harvesting 20 μW from RF sources.

In some embodiments, an EHVD uses Thermoelectric transducer 816. Power converter-tet 811 conditions and converts the harvested power suitable to be accepted by QCR 807.

An embodiment of this teaches an EHVD that uses electro-magnetic transducer 815. One embodiment is shown in FIGS. 5 and 6. (A non-limiting example of coil in a magnetic field loaded with a mass that vibrates and generated EMF as a person wearing Ekey moves about during daily activity, a dynamic loudspeaker). Power converter-emt 810 conditions and converts the harvested power suitable to be accepted by QCR 807.

An embodiment of this teaches an EHVD that uses Piezoelectric and/or electrostrictive (PE) transducer 814 mounted in the Ekey that generated EMF due to strain by a person wearing the Ekey moves about during daily activity. Power converter-pe 809 conditions and converts the harvested power suitable to be accepted by QCR 807.

When the Ekey 240 suitably housing a PE transducer 814 is put in a wallet which is further put into a person's back pocket while sitting or driving a car generate significant stress that the transducer converts into high voltage electric output.

Unlike prior art (E.g. U.S. Pat. No. 6,433,465 incorporated herein by reference, and conventional Piezo transducer harvesters) this disclosure teaches not only harvesting energy due to high stress (that generates high enough voltage to be directly charge a battery), but also harvesting energy due to lower stress (E.g. stress level that produce ~1 volt EMF) as shown in FIG. 11B. The output from PE EHVD 814 is often low frequency (E.g. 0.1-10 Hz) that use of transformer to step up the voltage before the energy can be harvested becomes impractical due to size and cost.

FIG. 11B shows a PE harvester 814 and power converter 809. It accepts input voltage from PE EHVD 814 and if the signal is strong (E.g. >2 volt) it routes it to QCR 807 by using a diode 1105 (to explain the concept only one diode is shown, however it is not limiting to that but one can use other circuits like bridge rectifier etc.). However when the voltage input is not strong enough, the input is sensed by power level sensor 1110, and rectified by an active bridge 1112 using MOSFET switches. The slowly varying input voltage waveform is converted to higher output voltage across output capacitor 1109 by either:

a) Converting input power to high frequency (say 200 KHz) AC by using a chopper switch 1106 and then stepped up by a small size high frequency transformer 1107 followed by a rectifier 1108. One could also use a voltage multiplier circuit for stepping up.

b) Alternatively one can use a boost switching converter

Figure 9F:
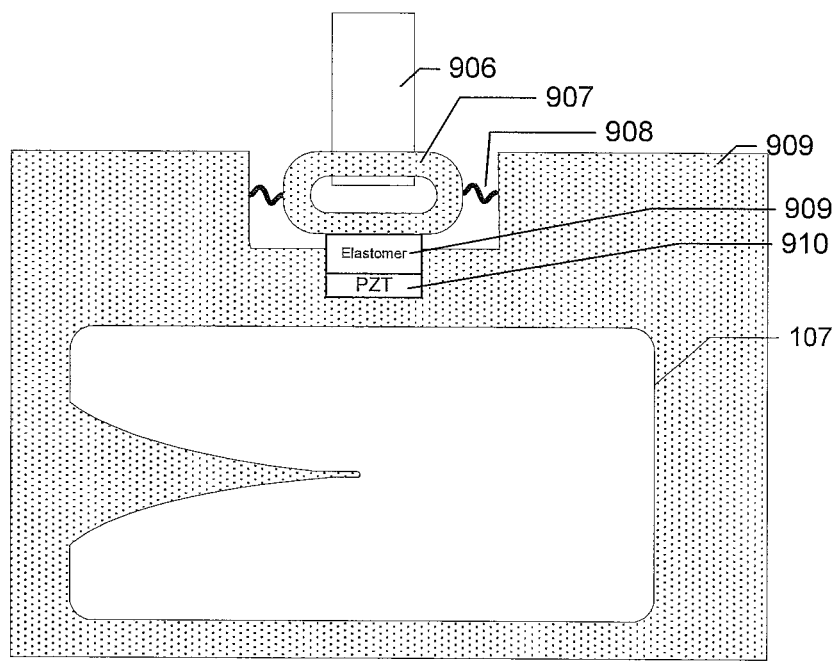
FIG. 9E, 9F shows methods to mount energy harvesting mechanical transducers on a badge style Ekey, and corresponding electronic function blocks.
Figure 9E:
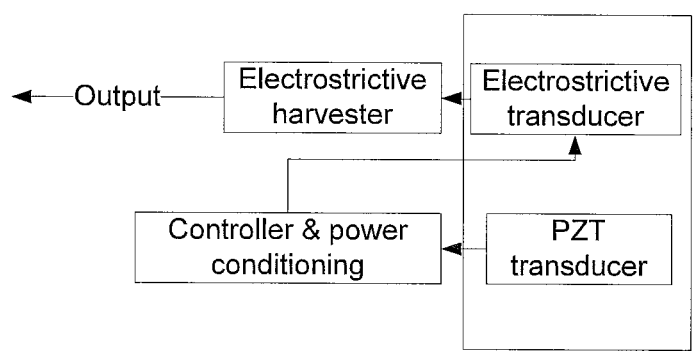

FIG. 9F shows a way to harvest energy for using PE EHVD transducer. The Ekey 240 in the form of a badge hangs off a badge hook clip 906 affixed to apparel worn by a person that connects to a badge hook 907. The badge hook 907 is connected to a PE element comprising an Elastomer 909 connected in series with a Piezo-electric transducer 910, which in turn is mechanically affixed to badge body 909. The weight of the badge is bourn though badge hook going the Elastomer element 909 and Pzt element 910. As a person wearing the badge walks her gait introduces a vertical oscillatory motion, straining the Elastomer element 909 and Pzt element 910 generating electrical power. FIG. 9E shows a block diagram arrangement of using high voltage from Pzt to bias the Elastomers element with necessary high voltage so that it can generate maximum harvested energy. It should be noted that one could also use some embodiments of this invention by using only one class of transducers like PZT or Elastomer based transducers and other transducers based on material property that convert mechanical stress to electricity.

The PE transducer 814 could also double up as audio speaker and microphone 832 by switching it to connect to codec 831.

In some embodiments a combination of various power control functions (834, 807, 808, 835, 836, 809, 810, 811 and 812) could be merged into a common function block for better performance and cost optimization.

Sensors and Others

In an embodiment the Ekey 240 comprises sensors that measure various environmental parameters and user inputs. A user can press the E-call switch 830 that signals to the micro-computer 801 various user commands (E.g. Emergency/distress call, Lockdown command to nearby door(s) etc).

Gross motion sensor switch 828 sends a digital signal pattern to the microcomputer 801 when the Ekey 240 is mechanically moved. The signal could then be used by Ekey 240 to operate other electronic sensors (E.g. Spatial motion sensor 819, E-field sensor 824 etc.) or functions (E.g transition for various level of sleep condition or operating mode, etc.).

Representative non limiting examples of Gross motion switch 828 are: mercury switch, mechanical vibration switch using a metal ball or spring mass that roll on to nearby electrical contacts (E.g. SENSOLUTE GmbH part #'MVS0608.02'—Micro vibration sensor), Piezo sensor.

The spatial motion sensor 819 comprises
a) accelerometers
b) rate gyro sensors
c) magnetic compass When powered by microcomputer 801 the accelerometer and rate-gyro provide linear and angular acceleration measurement to the microcomputer 801 respectively. That information is integrated to obtain change of velocity, and then integrated again to obtain displacement. When three axis accelerometer and rate-gyros are used, Ekey 240 can establish initial inertial reference frame upon power up and thereafter accurately measure spatial motion. Three axis accelerometers allow determination of local horizon and magnetic compass provides angular position of north direction allowing quick establishment of absolute orientation of the Ekey. Even if magnetic compass is not present spatial motion can be determined assuming an arbitrary initial azimuthal orientation. A somewhat less accurate spatial position can be determined by only using accelerometers.

In an embodiment Spatial sensor 819 allows Ekey 240 to sense user gestures as the user manipulates her hand while hold the Ekey, or manipulate the Ekey 240 by hand or other means. Sharp gesture can be easily determined (E.g. vertical tapping of Ekey 240 on wall or table top, flat orientation tapping, rotational flip etc.) along with the intensity of the gesture.

In another embodiment Spatial sensor 819 can also measure subtle user body movement when a user is wearing Ekey. It allows easy measurement of user's physical activity level, mobility and as well as immobility. Reliability is further increased when Ekey 240 can determine the user is indeed wearing Ekey 240 by using the information from body electric field sensor 822 (providing capacitance information due to skin proximity) and E-field perturbation.

In an embodiment E-field Sensor 824 measures electric field generated by intentional electric field generator and the environment as well the perturbation caused by movement of people and things. It measures electric field by measuring the voltage on E-field electrode(s) 825 in single ended or differential mode. In some embodiments it demodulates and recovers the data transmitted by an intentional electric field generator. In some embodiments the center frequency and bandwidth of the E-field Sensor 824 is dynamically changed to per data communication protocol. In yet another embodiment E-field sensor may comprise many detectors measuring electric field intensity at specific frequencies. The E-field sensor interfaces with analog and mixed signal interface block 827, provides suitable interface to micro-computer 801. In some embodiments analog and mixed signal interface block 827 functionality may be subsumed by the microcomputer 801 or the sensor 824, obviating its need.

In an embodiment Body E-field sensor 822 is similar to E-field sensor 824, except that it operates at a much lower frequency band (typically few Hz to few KHz) such that it can capture electric field generated by biological aspects of human body (E.g. nerves, muscles, tissues) as well as electric field perturbation caused by human body. It measures electric field by measuring the voltage on E-field electrode(s) 825 in single ended or differential mode. In another embodiment the center frequency and bandwidth of the E-field Sensor 824 is dynamically changed to tune into dominant ambient radiation (E.g. from mains power line, VLF, ULF, SLF, ELF radio transmitters) so that contributory change due to physical changes in nearby environment can be measured. In an embodiment it can also measure capacitance due to body skin and estimate electrode's 825 distance from the skin. A method to measure capacitance is where one of the electrodes is used to generate an electric field stimulus and the response on the E-field electrode is used to determine the capacitance and capacitance dissipation factor. Dissipation factor is an important parameter that allows distinguishing the proximate material is biological tissue or in-animate physical parts (E.g. metal pieces).

In some embodiments E-field sensor 824 and Body E-field sensor 822 may use common circuit elements and e-field electrodes.

Another embodiment of Ekey 240 comprises a GPS receiver 829 (with integrated GPS antenna) that can be turned on by microcomputer to provide its GPS position. This function allows Ekey 240 to provide this information when requested by application software server or when Locator (E.g. tracker) asks for positioning information.

Another embodiment of Ekey 240 provides audio communication capability to the user by employing Codec (Coder Decoder) 831 to provide audio compression and a loudspeaker 832 that could also serve as microphone in half duplex operating mode. Thus Ekey could
 a) announce messages to the user based on command from application software server,
 b) allow a remote person using application software server to speak the user
 c) Allow two way communication between Ekey user and a remote person that is using application software server.

In some embodiments Loudspeaker 832 function and PE transducer 814 function could be merged by using a shared PE transducer that can be switched between the two functions depending on need.

Another embodiment of Ekey 240 comprises a finger print sensor 821 so that when needed the microcomputer read and verify finger print of authorized user. This additional authentication increases system integrity, so that if a person other than the intended Ekey user tries to use the Ekey obtained by error or fraud, the Ekey 240 can be made to operate in a mode different from normal operating mode for an authorized user.

In addition to user interaction with Ekey 240 using Ecall switch 830, an embodiment of Ekey 240 may further comprise a touchpad 826 allowing availability of many more keys/buttons towards greater ease of use and functionality.

Access Control System

Figure 2:
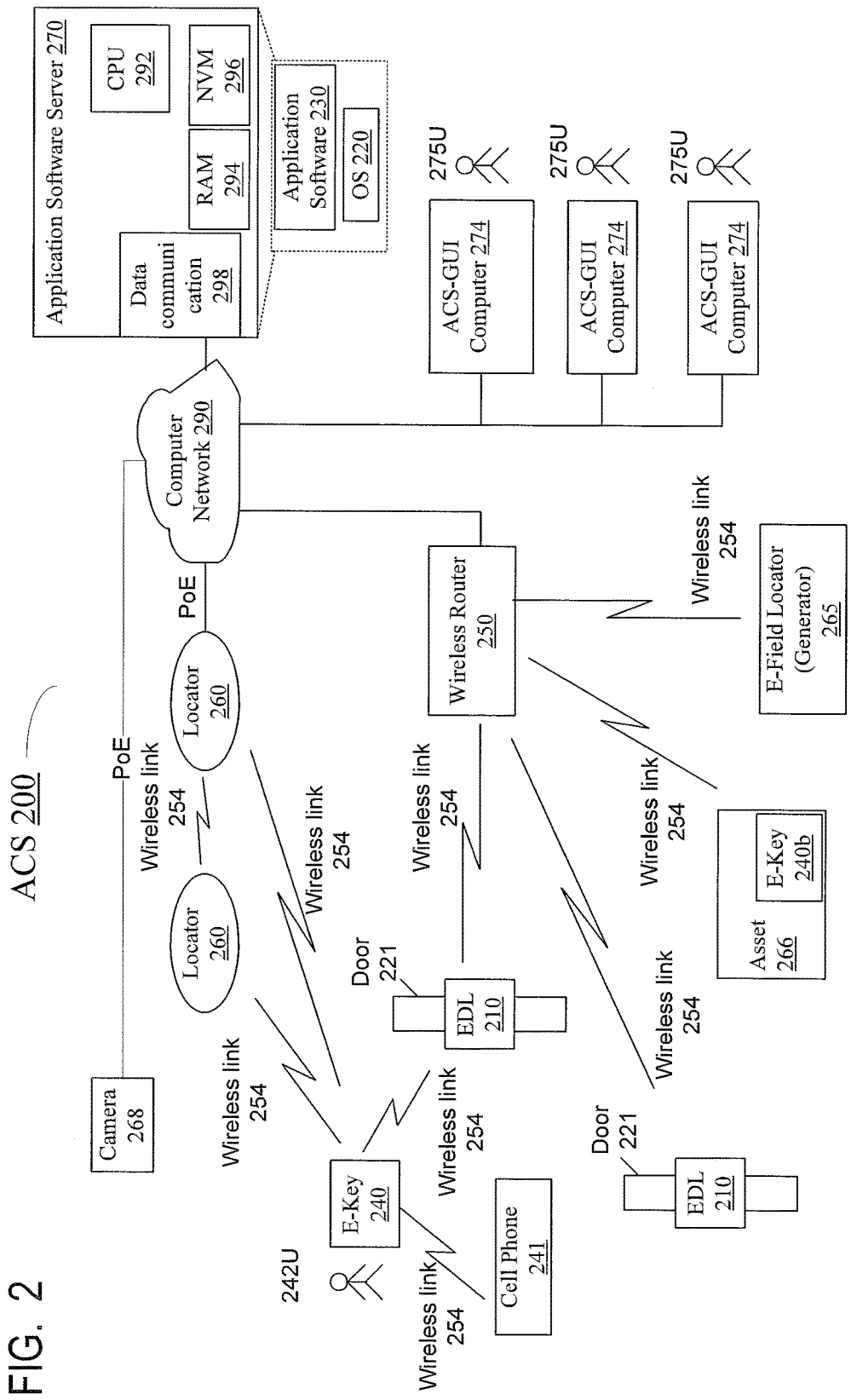
FIG. 2 shows an embodiment system block diagram of Access Control System of the present disclosure.

FIG. 2 shows an exemplary Access Control System 200 in the context of which the Ekey 240 may be used. Access Control System name is a place holder but the system could perform many other functions (non-limiting examples like security system, tracking, activity management, public announcement, emergency management, emergency marshaling area auditing, wandering protection in senior care, patient monitoring, asset tracking, asset tracking, etc. apart from just traditional Access Control functionalities). The Application Software Server (ASS) 270 can be a typical server computer with CPU (292), volatile and non-volatile memory (294, 296) and data communication devices such as network cards (298). The Application Software Server (ASS) 270 also runs an operating system 220 and on top of that the Application Software 230.

The ASS 270 is connected over computer network 290 to the other components of the system. Connected to this network are client application GUI computers 274 that can be used by users 275U to monitor and configure the system, such as to define access rights to doors, to query the state of the system, use and control devices connected via communication interface or to get notified about exceptions and alarms. The connection could be wired or wireless.

Also connected to the computer network 290 are one or more of the following:
 a) Locator devices 260, used to determine the location of Ekeys 240,
 b) Wireless routers 250, is a type of locator device that also provides wireless connectivity to various other components of the system, such as EDL 210 and Ekeys 240.
 c) Camera (Video or still) 268 that can capture optical images depending on configuration or command from ASS 270. The camera may additionally comprise mechanical actuators to change to desired spatial orientation the camera's field of view.

Electronic door locks (EDLs) 210 are mounted on doors 211 and are configured to unlock the door when an Ekey 240 carried by an authorized user 242U is within a configurable range. EDL 210 is connected over a wireless link 254 to routers. Over this link the EDLs 210 can receive access control information and other commands from the ASS 270 or report events to the ASS 270. In another embodiment EDL 210 also implement the functionality of a locator.

An EDL 210 periodically scans its environment to find nearby Ekeys 240 and, when found, determined whether the associated user has permission to access the door at the given time.

Some aspects of the disclosure were motivated by authentication problems related to Smartcards, RFID tags and other hardware security tokens (also called identity tokens or hardware tokens or just tokens herein). The disclosure is not limited to such problems however.

For additional security, the user may be required to hold one or more additional tokens at the same time. For example it may be required that the user wear an Ekey 240 in the form of a badge and also carry a second Ekey 240 somewhere else on the body at the same time. This way, if only one of the devices is lost and found by an intruder, the intruder cannot gain access to any protected resources. In one embodiment the Tokens are independent of each other, thus EDL 210 performs check to ensure both tokens have valid access permissions to unlock and present at the same time. In another embodiment the Ekey 240 validates itself by checking that the specific additional token(s) is in communication range.

This concept can be modified to require a first Ekey 240 and a cell phone 241 to be carried by user 242U, whereby the nearby presence of the cell phone 241 is verified by the Ekey 240 using a Bluetooth connection or similar connection, either every time it is used to gain access to a resource, or beyond a configurable maximum intervals since last verification. In some embodiments to set up this functionality the Ekey 240 would have to be paired with the cell phone first using a method that is similar to the pairing of a Bluetooth headset. One could optionally prevent a rouge who finds a lost Ekey 240 from pairing it with rouge's phone, the association can only be removed remotely by a command from the ASS.

Another method to limit damages with lost or stolen Ekey is to require users to periodically authenticate themselves to the Ekey (for higher security more than one authentication may be called for). This may be required every time a restricted resource is accessed (or operated upon) or in certain configurable time intervals. The Ekey 240 may indicate the need for renewed authentication to the user by flashing an LED (Indicator display 841) or by emitting a sound. Alternatively the EDL could also indicate that access cannot be granted because renewed authentication is required.

Said user authentication can be done in several ways, but is not limited to these methods:

a. If the Ekey 240 has motion sensing capabilities (spatial motion sensor 819) the authentication can be based in gestures where the user moves the Ekey 240 in certain ways or taps it in a specific timed sequence against a hard surface.
b. If the Ekey 240 has a key pad (touchpad 826) the user may have to enter a PIN or password.
c. If the Ekey 240 is paired with a cell phone 241 the user may use an application on the cell phone to authenticate himself using one of many possible authentication methods that are commonly in use on cell phones.
d. If the Ekey 240 has a microphone 832 the user may have to speak a passphrase that the Ekey 240 compares to a previously recorded voice sample.
e. If the Ekey 240 has a fingerprint sensor 821 the user may have to scan her finger which the Ekey 240 compares to a previously stored fingerprint.

As mentioned earlier, Ekey 240 may be equipped with an e-call switch (button) 830 that can be used to send out distress signals. When activated by the user the Ekey 240 makes an attempt to find devices, such as Locators 260, EDLs 240, or Routers 250, that can relay the distress message to the ASS 270. If the Ekey 240 has any location information (for example if it has a built-in GPS receiver 829, or if it is paired with a cell phone 241 with GPS receiver, list of EDLs that most recent communicated with the Ekey) it can include that information in the distress message. After picking up the distress message the Locators 260, EDLs 240, or Routers 250 will send a notification to the ASS 270. The ASS 270 can optionally then instruct Locators 260 in the vicinity of the Ekey 240 to determine the exact location and trajectory of the Ekey 240, and then the ASS 270 will notify users 275U whose role is to respond to such e-calls.

To prevent accidental transmission of the e-call due to inadvertent pressing of the e-call button 830, the user has to the press the e-call switch 830 in a certain pattern to tell Ekey 240 it is indeed a intentional e-call initiation (E.g. pressing the e-call button 5 times within 3 seconds, rapidly pressing the e-call button 3 times followed by keeping it pressed for at least 3 seconds).

In one embodiment the Access Control System 200 contains cameras 268 and after receiving an e-call notification with the location of the originating Ekey 240 the ASS 270 can activate the cameras 268 that are in the vicinity of the Ekey 240 and set them to photograph, record or put their live video feed onto the screen of the user 275U who responds to the e-call.

If an Ekey 240 has voice capabilities the system can establish a direct voice channel between the responder 275U and the user 242U in distress. The voice call can be routed using the existing infrastructure from the client computer 274, via ASS 270, the computer network 290 and a locator 260 or router 250 device to the Ekey 240. Alternatively, a call to the user's cell phone 241 could be placed automatically. In this case the Ekey 240 via its Bluetooth connection could be configured to automatically pick up the call and use its built-in speaker and microphone as a hands-free device.

Alternatively, or if the Ekey 240 is not in range of any device that can relay distress messages, but if the Ekey 240 is paired with a cell phone 241, it can instruct the cell phone 241 to send a text message or email to a preconfigured destination, possibly also including GPS coordinates, or place a phone call where the Ekey 240 can act as a hands-free device.

Recent shootings at school and university campuses have demonstrated the importance of protecting staff and students from harm in the event of a shooter on campus. One component of the protection strategy involves preventing the shooter from entering buildings and rooms that may be populated by potential victims.

A method that is employed in this case is called Lockdown, where entrance through doors is limited to a smaller set of people, such as emergency responders. A shooter, even with an Ekey 240 (or an Ekey 240 obtained under duress from a person with normal access) that would be valid otherwise, would not be able to unlock a door that is in lockdown mode and thus would be obstructed from entering the room full of innocent people.

The e-call button 830 (or alternately a separate switch button) can be used to send out "lockdown command" to immediately put in lockdown state a configured set of ELDs 210. When "lockdown command" is activated by the user the Ekey 240 makes an attempt to find devices, such as Locators 260, EDLs 210, or Routers 250, that can relay the distress message to the ASS 270. If the Ekey 240 has any location information (for example if it has a built-in GPS receiver 839, or if it is paired with a cell phone 241 with GPS receiver, list of EDLs that most recent communicated with the Ekey) it can include that information in the distress message. After picking up the distress message the Locator 260, EDL 210, or Router 250 will send a notification to the ASS 270. The ASS 270 can then instruct EDLs 210 for the configured set of doors to go into "Lockdown" state. ASS 270 will also notify users 275U whose role is to respond to such "lockdown command" events.

To prevent accidental transmission of the "lockdown command" due to inadvertent pressing of the e-call button 830, the user 242U has to the press the e-call switch in a certain pattern to tell Ekey 240 it is indeed a intentional "lockdown command" initiation.

Unlike magnetic field based near field communication that consumes enormous power and requires large coil size to generate it, this disclosure teaches using E-field that takes far little power to generate an electric-field, and can be generated by compact electrodes. Part of the Access Control System 200 can be an E-Field Locator (Generator) 265 that generates an alternating E-field (in one or two polarization) to be picked up by nearby Ekeys 240 that are equipped with E-field sensor 824. By modulating the signal, data, such as an ID of the E-Field Locator, can be transmitted to the Ekey 240. To prevent spoofing the E-field Locator 265 may use cryptographic means to broadcast a temporal parameter along with generator ID. In one configuration the Ekey, when first receiving the signature (ID) of on E-Field Locator 265 can attempt to contact a Router 250 or Locator 260 in order to transmit a message with the Ekey's ID and the ID of E-Field Locator 265 to the ASS 270. This system can be used to implement choke points where the presence or passage of Ekeys in a certain location (the location that is covered by the E-field Locator) produces a record of that event. Such a system would be useful in an asset-tracking application where an Ekey (240b) that is affixed to an asset (266) that needs to be tracked as it enters or leaves certain areas. In an embodiment E-field locator 265 may have capability to communicate with a Wireless router 250 so that ASS 270 can monitor and configure it.

Alternatively, an Ekey 240 can be configured to expect to be within the reception range of an E-Field Locator 265 at all times and to send an alarm message when a signal from the E-Field Locator can no longer be received.

Planar Ekey

FIGS. 3A, 3B, 3C, 3D, 3E, 4A, 4B, 4C, 5A, 5B, 6A, 6B, 7A and 7B show various embodiments of the disclosure that tremendously reduces the form factor of the Ekey 240 by using a battery that is extremely thin, yet one that does not interfere with the performance of ODA (Omni directional antenna. FIGS. 14A, 14B, 14C). It should be noted that while this specification refers to use of ODA in an Ekey 240 design, but for those skilled in the art will understand that the teachings can be applied when using other types of antenna. One skilled in art can mix and match the teachings of this layout and packaging methods taught in this patent specification.

Figure 3A:
Figure 3B:
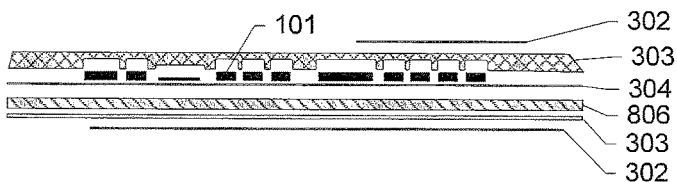

FIG. 3A depicts cross section view of one way to realize planar (low profile) Ekey 240 comprising some or all functional blocks of FIG. 8. FIG. 3B is an exploded view of FIG. 3A teaching high density packaging layout. The packaging allows flexing of the Ekey 240. The electronic components 101 are preferable assembled on one or both sides of the flexible printed circuit (FPC) 304 (I.e. use FPC 304 instead of a rigid substrate PCB 102). A custom low thickness battery 806 is packed on one side of the FPC 304 suitably insulated with an insulating film in between. In this embodiment the battery is of uniform thickness and thus easier to fabricate. The other side of the FPC 304 is covered with an insulating material that acts as a protective stiffener cover 303 that has custom pocket to allow relatively snug fit with electronic components 101, thus providing strength against mechanical impact force from the flat side of Ekey as all the force bypasses the electronic components. It provides mechanical protection to the FPC assembly with minimal addition to overall thickness. Protective stiffener cover 303 could be realized by various methods known to those skilled in art, including molding, lamination etc. Another protective stiffener cover 303 on the side of the battery envelops the FPC 304, electronic components 101 and battery 806. In an embodiment the FPC assembly is not tightly encapsulated with protective stiffener cover 303 and battery 804, instead it is allowed to slip along the contact surface, so that when the Ekey 240 flexes it does not stress the FPC assembly. Similarly the battery 804 is not stressed by flexing of the Ekey. In an embodiment the battery 804 is packaged in narrow sections (see FIG. 5A, 5B) that are aligned along the width of Ekey 240 to minimize stress due to flexing of Ekey. This method (in FIG. 3A, 3B) puts least stress on FPC 304 as the FPC is located almost along the neutral stress plane of flexing, with thick protective stiffener cover on one side and an almost same thickness of battery 806 and protective stiffener cover on the other side. The flexible photovoltaic cell(s) (FPVC) 302 are stuck to the exposed outer surface of protective stiffener cover 303 to harvest ambient light energy. FPVC 302 is electrically connected to circuit in FPC assembly. Further FPVC 302 is preferable chosen with a protective film to protect it from scratching from hard objects during normal use.

Figure 3C:
Figure 3D:
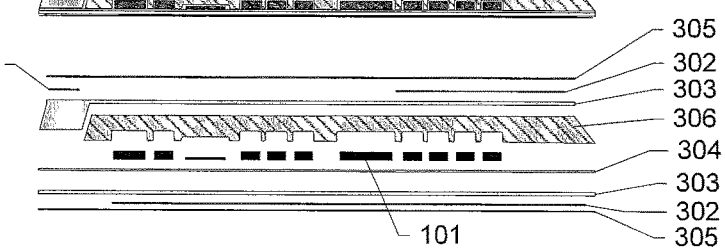
Figure 3E:
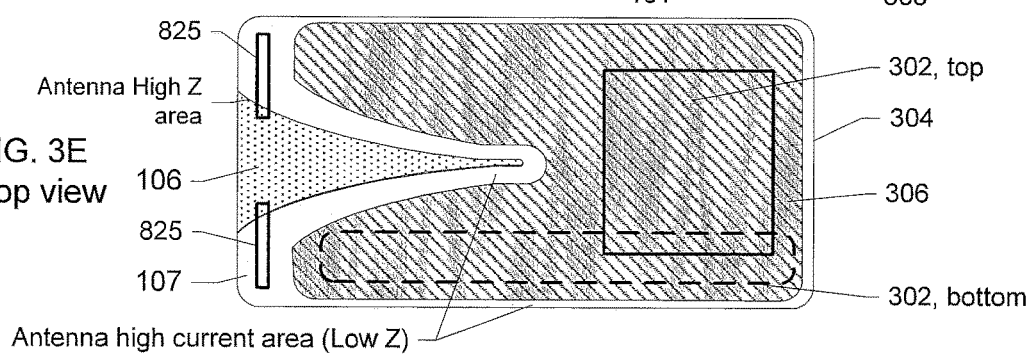

FIGS. 3C, 3D and 3E shows another embodiment of planar Ekey 240 using ODA. A multi-layered FPC 304 uses one layer that acts as a power layer (I.e. Ground or $V_{dd}$ supply) and is shaped to be ODA. To maintain the same battery volume (for comparative energy capacity as a non-planer Ekey) the area of the battery must increase. However increasing the battery to the shape of the Ekey's PCB 102 (or FPC 304) may compromise the operation of the ODA. So some embodiments of this invention accomplish the objective by using a battery that is very thin (E.g. about 1 mm thick); and to maintain ODA's RF performance this disclosure teaches the battery shaped to follow the contour of the ODA ground plane but be shorter (smaller) than the ODA contour to ensure that portions of the ODA that carry large RF current largely stay (concentrated) confined to well defined copper substrate (part of the electronic printed circuit board) and also portions of the ODA that contribute to E field have capacitance defined by ODA copper structure. One could in another embodiment factor in the thickness of thin battery overlaid on the ODA copper plane to operating frequency and bandwidth. As only a small fraction of FPC 304 area is occupied by the electronic components 101, the battery 306 is made to conform to the surface presented by a FPC 304 that is loaded with components 101, this allows most efficient use of the overall available volume. Unlike the embodiment in FIG. 3A the conformal battery 306 is packaged on the components side of the FPC assembly, thereby most efficiently using the available volume for maximum battery capacity. The outer surface of the battery is protected by a thin protective stiffener cover 303, which in turn has place to mount the FPVC 302, as well E-field electrode 825. The bottom surface is protected by another protective stiffener cover 303 that is welded to the top protective stiffener cover 303, thus protecting the electronics from mechanical damage. Like the top protective stiffener cover 303 the bottom protective stiffener cover 303 also has a FPVC 302 to harvest light energy, and both the top and bottom surfaces are further protected by a transparent protective film 305 that is abrasion resistant yet allows easy transfer of ambient light to the underlying FPVC 303. The area not covered by FPVC 302 may further be used to imprint relevant information that is usually printed on an employee badge.

Figure 4A:
Figure 4B:
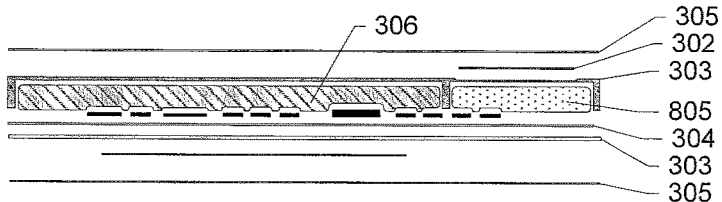
Figure 4C:
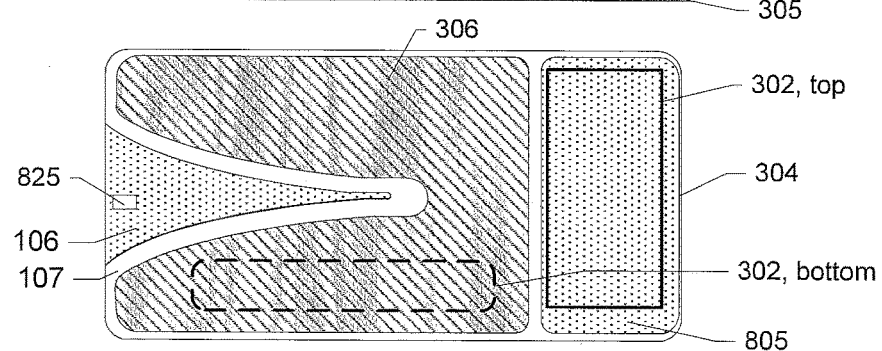

FIGS. 4A, 4B and 4C shows another embodiment of planar Ekey 240 that additionally packages ES 805. The ES 805 may or may not require conformal shape. Further the FPVC 302 is nested in a recessed packet carved on the outer surface of protective stiffener cover 303, such that the transparent protective film 305 is almost flat across the whole surface.

In one embodiment the battery 306 is RF connected to the flex circuit at select locations to reduce effect of conformal battery affecting antenna radiation pattern, resonance frequency or gain.

FIGS. 5A and 5B show another embodiment of a planar Ekey 240 that packages a conformal ES 805 on bottom side of the FPC assembly and a conformal battery 306 on the other side, an EM transducer 815 is nested to one end so that it does not interfere with ODA function and FPC assembly. The space indicated for EM transducer could instead be used to house Thermoelectric transducer 816 as it presents an efficient thermal path that is essential for thermoelectric transducer. The battery 306 is packaged in narrow sections that are aligned along the width of Ekey 240 to minimize stress due to flexing of Ekey. The FPC assembly is again located near midpoint of thickness in the plane of least flexural stress, thus sees little stress corresponding to improved reliability. A PE transducer 814 is located on one surface of the Ekey 240 to serve as EHVD that could be switched to also act as an acoustic transducer serving as a loudspeaker and/or microphone.

FIGS. 6A and 6B show another embodiment of a planar Ekey 240 shown in FIGS. 5A and 5B that packages a conformal ES 805 and a conformal battery 306 on a side of the FPC assembly. It has the advantage of being very thin.

FIGS. 7A and 7B show another embodiment of a planar Ekey, that has more generous area availability (E.g. a traditional employee badge size). The additional area is used to more optimally place the E-field sensor 825. E-field sensor 825A is an ideal location for E field sensor electrode for an antenna whereby the wire connecting the Efield electrode passes along the symmetry line between ends of antenna poles, thus not disturbing the antenna. The available space is also used to form a loop antenna 817. To ensure the low frequency loop antenna does not interfere with the much higher frequency main antenna (say 2.5 GHz ISM band), the loop is broken into small segments that are interconnected by a microwave block 702 that appears as open circuit to 2.4 GHz and short circuit for the intended low frequency (preferably the small segments length is shorter than ¼ wavelength). An exemplary microwave block 702 comprises a parallel tank circuit tuned at 2.4 GHz. The available area could additionally be used to place parasitic antenna element 701 (example in the figure shows a multipurpose structure that is E-field sensor plus meandered dipole director antenna element) to supplement the main antenna 833.

Tracking

An embodiment of this invention teaches combined use of Time of flight (to get distance estimate) and steerable beam (to get azimuth direction estimate) to position the location of the tag. This method is much more cost effective as a standalone reader can provide positioning without requiring complex cabling or communication between multiple readers. Unlike prior art methods (E.g. Navigation aids do not have low battery energy constrain like an Ekey. Unlike radio navigation aids like VoR (Very high frequency omni range), TACAN (Tactical air navigation system) and Secondary surveillance radar (SSR), this disclosure teaches a method where Ekey 240 and Tracker 1002 are not continuously on, and have to first discover each other and establish communication (for example using methods taught in US 20100040120 Low power radio communication system, US 20130136046 Establishment of wireless communications), and then distance is estimated by stationary Tracker 1002 (using RSSI method or Time of Flight measurement), and bearing determined by Tracker. Optionally the Ekey 240 is informed by Tracker 1002 of its estimated position. Again this disclosure disclosed a method that is different from Ground control Precision Approach using Precision approach radar (PAR), as all the transmission and measurement is done by radar without any co-operation by the target (aircraft).

FIG. 10A shows a system to track the location the Ekey. The tracker 1002 is a high power radio with directional antennas with orthogonal polarization capability so that it can communicate with an Ekey's antenna (including those Ekey that use ODA) irrespective of the relative orientation of the Ekey 240 (I.e. user is not required to ensure Ekey is in a particular orientation). To conserve Ekey's energy the tracker periodically scans for presence of Ekey (typically 15 second period). Ekey has a coarse clock but it does not have a chronometer or a precise clock due to cost, power, energy and space considerations. The tracker 1002 enclosed in a Radome 1001 has multiple directional antennas.

In the FIG. 10A example, Tracker's 1002 full 360° coverage is provided by 15 antenna beams 1000. Ekey's azimuthal position is resolved by comparing its communication signal strength from multiple antenna beams. This exemplar arrangement provides 8° angular resolution corresponding to 45 sectors {8°=360/(15*3), as each beam is subdivided into 3 portions due to overlapping of beams}

The tracker 1002 polls for presence of Ekey 240 in its coverage area using different antenna beams. communication (for example by using methods taught in US 20100040120 Low power radio communication system, US 20130136046 Establishment of wireless communications)

After making contact with Ekey 240 and mutual authentication by cryptographic means, the Ekey 240 and tracker 1002 estimate mutual distance by RSSI method, communicating using a calibrated transmitter power (plus antenna gain) and measuring receiver signal strength measurement (RSSI). Alternatively it can use ToF (Time of flight) measurement for distance ranging. In another embodiment it uses both RSSI and ToF technique for accurate azimuth and range estimation respectively (particularly in an environment that has significant RF reflection due to buildings etc).

The omni-direction response of ODA in an Ekey 240 enables distance estimation (as per SecureALL patent application: US20120169543) when Ekey 240 is located within uniformly illuminated solid angle of the tracker antenna (say 1.5 dB beam-width of the antenna).

Overlapping antenna beams allow further azimuth resolution of Ekey 240 position. FIG. 10A shows beam pattern from a set of directional antennas whose azimuthal beam width is 30° with overlapping coverage. Instead of using 15 immobile antennas, one could alternatively use a tracker with physically steered antenna. (See FIG. 10C, Cylindrical shaped steerable beam antenna array formed by triangularly arranged antenna array that revolves inside the Radome 1001).

FIG. 10B is an embodiment of the system in FIG. 10A, where the 15 beams of 24° width are realized by three antennas arrays (Ant1 1003, Ant2 1004 and Ant3 1005). The antenna is a phase steered antenna with beam width of 24° where beam 1008 can be phased steered 1006 on either side by ±24° (B, D) and ±48°.(A, E). Phase steered antenna with greater beam steering resolution can be realized that easily yields finer azimuth position estimation.

Azimutal position estimation with a resolution that is finer than antenna beam width:
a) Tracker 1002 communicates with an Ekey 240 communicates using Antenna beam C.
b) Tracker 1002 communicates with an Ekey 240 communicates using beam A, neighboring beam B and D measuring the RSSI in the process (call it as RSSIb, RSSIc, RSSId).
c) Finer azimuthal position of Ekey is estimated by following logic:
 i. When (RSSIc>RSSIb+3) and (RSSIc>RSSId+3) its azimuth position is dead on (bore-sight) and a fraction of the antenna beam width (FIG. 10B, area marked B'.C.D' 1009).
 ii. When (RSSIc≈RSSId) its azimuth position is on the beam overlapping region of the antenna beam C and D (FIG. 10B, area marked C.D 1010).
 iii. When (RSSIc≈RSSIb) its azimuth position is on the beam overlapping region of the antenna beam C and B (FIG. 10B, area marked B.C 1007).

One can estimate even finer resolution by knowing a priori the beam's radiation pattern, and mathematically estimating the azimuth position by measuring the RSSI from main beam 1008 and neighboring beams.

An embodiment of this invention uses steerable antenna beam using active electronically scanned array (AESA) or passive electronically scanned array (PESA) that allows greatly improved azimuth position. Given that beam shaping and null suppression can be easily done using the AESA and PESA azimuth estimation is greatly improved by measuring rapid change of RSSI as the Ekey 240 position falls on the edge of the beam.

An embodiment of this invention teaches combined use of Time of flight (E.g whereby the Ekey 240 responds to Tracker 1002 communication with a known delay, and the tracker factors in that delay in when it times the response from Ekey. This method is well known in art such as receiver correlation, pulse compression, Ultra Wide Band communication etc.). This method is much more cost effective as a standalone reader can provide positioning without requiring complex cabling or communication between multiple trackers that are based on triangulation method (angular, distance or a combination). This method also allows use of power and energy constrained Ekey 240 to realize a position tracking system.

Tracker 1002 can additionally communicate with the Ekey 240, and ask for temporary activation of GPS electronics 829 to get its coordinates, and send the coordinate information to the tracker. This is particular suitable for trackers that provide outdoor coverage.

Embodiments of the disclosure described above are only exemplary. Where Ekey is described in the specification, it could also be applied to other types of device or appliance. One skilled in the art may recognize various alternative embodiments from those specifically disclosed. Those alternative embodiments are also intended to be within the scope of this disclosure.

The invention claimed is:

1. A structure comprising an electronic key constructed to operate from battery energy and energy harvested by at least a transducer comprising an electro-mechanical transducer which is a piezo electric and/or electrostrictive transducer; where the electronic key has a badge hook clip for attachment to an apparel, where the weight of the electronic key is supported via the electro-mechanical transducer.

* * * * *